United States Patent
Tsuji

(10) Patent No.: US 7,019,723 B2
(45) Date of Patent: Mar. 28, 2006

(54) DISPLAY UNIT COMMUNICATION SYSTEM, COMMUNICATION METHOD, DISPLAY UNIT, COMMUNICATION CIRCUIT, AND TERMINAL ADAPTER

(75) Inventor: Ryuhei Tsuji, Anan (JP)

(73) Assignee: Nichia Corporation, Tokushima (JP)

( * ) Notice: Subject to any disclaimer, the term of this patent is extended or adjusted under 35 U.S.C. 154(b) by 384 days.

(21) Appl. No.: 10/069,584

(22) PCT Filed: Jun. 29, 2001

(86) PCT No.: PCT/JP01/05686

§ 371 (c)(1),
(2), (4) Date: Jun. 17, 2002

(87) PCT Pub. No.: WO02/03365

PCT Pub. Date: Jan. 10, 2002

(65) Prior Publication Data

US 2002/0163513 A1    Nov. 7, 2002

(30) Foreign Application Priority Data

Jun. 30, 2000  (JP)  .............................. 2000-199420

(51) Int. Cl.
*H04N 7/18*  (2006.01)

(52) U.S. Cl. .......................... 345/87; 345/84; 345/204; 348/461; 348/467; 348/469; 348/564; 370/461; 370/464; 370/473

(58) Field of Classification Search .............. 345/378, 345/84, 87, 204; 348/461, 467, 469, 564; 370/461, 464, 473, 484
See application file for complete search history.

(56) References Cited

U.S. PATENT DOCUMENTS

| | | | | |
|---|---|---|---|---|
| 31,977 A | * | 4/1861 | Ott | ............................ 172/381 |
| 4,139,149 A | * | 2/1979 | Crepeau et al. | ............. 235/383 |
| 5,165,036 A | * | 11/1992 | Miyata et al. | ................ 712/25 |
| 5,646,959 A | * | 7/1997 | Kamishima | .................. 375/240 |
| 5,739,869 A | * | 4/1998 | Markle et al. | .............. 348/589 |
| 5,767,818 A | | 6/1998 | Nishida | |
| 5,898,827 A | * | 4/1999 | Hornung et al. | .............. 714/11 |
| 5,914,698 A | | 6/1999 | Nicholson et al. | |
| 5,986,622 A | | 11/1999 | Ong | |
| 6,091,771 A | * | 7/2000 | Seeley et al. | ................ 375/240 |
| 6,477,181 B1 | * | 11/2002 | Fujimori et al. | ............ 370/476 |
| 6,628,244 B1 | | 9/2003 | Hirosawa et al. | |

(Continued)

FOREIGN PATENT DOCUMENTS

EP    0 731 436    9/1996

(Continued)

*Primary Examiner*—Ricardo Osorio
*Assistant Examiner*—Vincent E. Kovalick
(74) *Attorney, Agent, or Firm*—Wenderoth, Lind & Ponack, L.L.P.

(57) ABSTRACT

A display data packet contains identification information. A display unit communication system includes a control unit, a terminal adaptor to which a terminal adaptor ID is assigned and which is connected to the control unit, and a display unit to which a display unit ID is assigned and which is connected to the terminal adaptor in series and drives a display element according to the display data packet supplied from the control unit. The terminal adaptor receives a display data packet, the terminal adaptor ID of which agrees with that contained in the identification information, and transfers the display data packet to the display unit. The display unit receives the display data packet, the display unit ID of which agrees with that contained in the identification information, and drives the display element to display an image.

4 Claims, 16 Drawing Sheets

U.S. PATENT DOCUMENTS 6,687,221 B1 * 2/2004 Kurose et al. ............. 370/230

FOREIGN PATENT DOCUMENTS

| | | |
|---|---|---|
| EP | 1 030 241 | 8/2000 |
| JP | 2-264995 | 10/1990 |
| JP | 8-23536 | 1/1996 |
| JP | 8-202316 | 8/1996 |
| JP | 8-328514 | 12/1996 |
| JP | 9-74551 | 3/1997 |
| JP | 9-247592 | 9/1997 |
| JP | 10-333631 | 12/1998 |
| JP | 11-126047 | 5/1999 |
| JP | 2000-505213 | 4/2000 |
| JP | 2000-250501 | 9/2000 |
| WO | 96/10244 | 4/1996 |
| WO | 97/39436 | 10/1997 |

* cited by examiner

DISPLAY UNIT COMMUNICATION SYSTEM, COMMUNICATION METHOD, DISPLAY UNIT, COMMUNICATION CIRCUIT, AND TERMINAL ADAPTER

BACKGROUND OF THE INVENTION

1. Technical Field

This invention relates to a lighting apparatus having a control unit providing a plurality of display units, which are lighting units, with lighting information such as image data, and the display units driving light emitting elements based on the lighting information provided by the control unit, and a communication method thereof.

2. Description of Related Art

Recently, high performance red, green and blue LEDs (hereafter also called light emitting diodes), which can emit in high brightness, have been developed, so that full-color LED displaying has been achieved. Among large size display apparatuses, LED display apparatuses, which have advantages such as high brightness, long-life, lightweight and so on, have become popular quickly. Furthermore, its uses become diversified, so that a system that can adapt flexibly to various applications such as large size TVs, billboards, traffic information boards, three dimensional display apparatuses, lightings and so on, is needed.

The various screen size and pixel pitch displays having LEDs become used from outdoor use larger size displays such as for billboards to relatively small size displays in semi-indoor such as platforms depending on purpose and place. Also, vertical-horizontal ratio (aspect ratio) tends to change, for example, when high vision image such as HDTV is displayed on LED, it should comply with increased image data size and further enlargement of display panel size. In addition, when the displays selectively illuminate billboards or articles or the like, various units should be assembled with each other similarly (the display unit according to this invention includes these various applications). In highly intelligent information network, displays are also required to be compatible for connection with communication infrastructure to be remote-controlled for display or maintenance or the like.

For example there is one of the displays, which is LED display having a plurality of LED units assembled in matrix corresponding to display size or aspect ratio of vertical-horizontal ratio, or the like, works as modularized LED units disposing 16×16 dot of LEDs in matrix. An exemplary LED display 801 is shown in FIG. 17. Plural distributors 804 connected with a controller 803 are disposed so as to correspond to each of the columns of LED units 802 to provide LED units 802 with image data for display and various control signals.

The controller 803 generates a control signal 820, for example a synchronizing clock for image data, a horizontal synchronizing signal, a vertical synchronizing signal, a blank signal, a gradation reference signal and a latch signal of the image data and so on, and provides each of the LED units 802 with the control signal 820 via the distributors 804. The full-color image data 810 for displaying, which are transmitted from the distributors 804 to each of the LED units 802, are required to have image data of at least each color of RGB (red, green, blue). Bit width of the image data is determined based on resolution range of gradation.

For example, in case each of the colors is displayed in 256 gradation range, an image data bus needs 8 bit width for each of three colors. These image data are provided for LED units 802 with time-sharing in the number represented by (number of the LED unit)×(number of the displaying dots). The image data 810 are provided with bit shift in shift resister 805 of each the LED units 802. When a predetermined number of the data are provided, the data are latched then captured as the image data 810 for displaying, and thus the image data can be displayed.

However, in such LED display apparatuses, the image data 810 for displaying is transferred between the controller 803, the distributors 804, and the LED units 802 via parallel bus which is a signal interface, and synchronizing clock which synchronizes with the image data, and the various control signals 820 are supplied. Because of this, the more the LED display apparatuses get high definition or larger sized display, the more signal lines are required. Especially, these days the display screen size tends to be enlarged and the number of the LED units be increased, and these increased and elongated signal lines may cause problems such as deformation and influence to noise of pulse width of the gradation signal and the synchronizing clock.

Also, to be ready for HDTV specifications, the aspect ratio of the screen might be changed and more LED units to be connected are therefore needed. This results in higher transferring speed of the image data. Increasing the number of connection of the LED units causes deformation of the pulse of each of the signals, especially input and output timing with the image data and synchronizing the clock gets more difficult.

Further, the requirement level for displaying image quality of the LED display apparatuses is getting higher and higher year by year, as well as downsizing LED, thus further development of an LED display technology which can show high definition has become urgent. To achieve high image definition, resolution of gradation must be increased. Specifically, the data bus specification must be changed, for example, image data bus width for display should be changed from the conventional 8 bit to 10 bit. In addition, to achieve high definition, LED size should be smaller so the dot pitch width is narrower. If dot pitch width got smaller, the LED unit size would be smaller proportionately. Consequently content ratio of mounted articles such as connectors tends to be higher because of increased image data bus width.

Furthermore, conventional LED display apparatuses could not communicate in common communication way among various LED display apparatuses which have different number of pixels per unit or display gradation.

To solve these problems, we suggested an LED display apparatus, which drives LED units by transferring data formatted in ATM (Asynchronous transfer Mode) packet form added with identifying information assigned to each of the LED units, disclosed in Japanese Laid-Open Publication TOKU-KAI-HEI-126047 (1999). Also, we suggested an LED display apparatus having automatic ID assigning means adding unique identifying information of each of LED display units after connection between the LED units completed to simplify setting among the LED units, disclosed in Japanese Laid-Open Publication TOKU-KAI-2000-221934 (2000).

However, considering more high definition, and more complicated combination of the LED units or high flexible design, there are not enough, and further improvement is needed.

It is an object of the present invention to provide a lighting apparatus, communication method, a display unit, a communication circuit and a terminal adaptor thereof, which is flexible enough to be capable of various applications.

SUMMARY OF THE INVENTION

To achieve the above object, there is provided in accordance with the present invention a lighting apparatus comprising a control unit providing display data packets set destination of communication by identifying information to a plurality of display units, at least one terminal adaptor which is assigned terminal adaptor ID, and connected with the control unit electrically via upper communication line. The display units include at least one light emitting element in which display unit ID is assigned and electrically connected in series with the terminal adaptor via a lower communication line, and drives each of the disposed light emitting elements based on the display data packets supplied by the control unit.

According to the present invention, there is also provided the lighting apparatus in which the display data packet includes at least the terminal adaptor ID and the display unit ID as the identifying information, the terminal adaptor receives the display data packet having the identifying information in which the terminal adaptor ID matches the terminal adaptor ID assigned to the terminal adaptor, and transfers the display data packet to the display units via the lower communication line. The display unit receives the display data packet having the identifying information which display unit ID matches the display unit ID added to the display unit, and drives the light emitting elements based on the display data packets.

According to the present invention, there is further provided the lighting apparatus in which the control unit transfers frame cycle start packet stating start of frame cycle in which the control unit adds the identifying information stating to be received by all of the display units. The display unit performs frame synchronizing based on the frame cycle start packet. Accordingly, the lighting apparatus can perform frame synchronizing even among display units connected serially.

Further, in the lighting apparatus according to the present invention, the display unit has a memory storing at least the display data, memory space in the memory is allocated data area based on circuit constitution in the display unit in advance. The control unit transfers display data packet to control the display units by accessing predetermined allocated memory area of the display unit in advance. Accordingly, the lighting apparatus achieves various controls of the display units using the display data packet.

Furthermore, in a lighting apparatus according to the present invention comprises, a control unit providing display data packets to a plural display units, at least one terminal adaptor assigned terminal adaptor ID, and having a terminal adaptor side communication section connected with the control unit electrically via an upper communication line. The display units include at least one light emitting element, and assigned display unit ID, having a display unit side communication section connected with the terminal adaptor electrically via a lower communication line, and driving at least one the disposed light emitting elements based on the display data packets provided by the control unit. In addition, the terminal adaptors and/or the display units are arranged in n rows (n is an integer which is two or more), each of the communication sections are connected to each other serially at each of the rows, the communication section for the terminal adaptors and/or the display units connected at end position of the lowest stream in m-th row (m is an integer, which is $1 \leq m \leq n-1$) farthest from the control unit is connected with the communication section of the terminal adaptors and/or the display units disposed in the (m+1)-th row at an end position of same side as the communication section of the terminal adaptors and/or the display units connected at the end position of the lowest stream in the m-th row from the control unit.

Further, the invention is characterized by that communication of the upper communication line is higher speed communication than communication of the lower communication line. Accordingly, the lighting apparatus can communicate with each of the display units in high speed at lower cost.

Furthermore, a communication method according to the present invention using display data packets in a lighting apparatus which comprises a control unit providing display data packets to a plurality of display units, at least one terminal adaptors assigned terminal adaptor ID and connected with the control unit electrically via upper communication line, the display units having an display section, which drives at least one disposed light emitting elements based on the display data packets provided by control unit, a memory having memory space according to number of color tones constituting one pixel and gradation number, assigned display unit ID, and connected with the terminal adaptor electrically via lower communication line. In the communication method, wherein the display data packet has at least identifying information area retaining the terminal adaptor ID and the display unit ID, memory space allotting area allotting memory space of the display units to be input, display data area constituted by display data corresponding to disposition of the light emitting elements, and number of color tones constituting one pixel and gradation number.

Furthermore, to achieve the above-mentioned object, a display unit according to the present invention comprises, a display section including a plurality of pixels, each of which is composed by at least one light emitting element in matrix, a communication section performing packet communication, a memory storing at least one frame display data, a driving section driving each of the light emitting elements of the display section. In addition, the display unit further comprises a control section generating blank signal stating start of driving cycle of each line based on frame cycle start packet stating start of frame cycle received by the communication section. The driving section reads the display data stored in the memory based on the blank signal corresponding to each of line, and drives each of the light emitting elements to display image at the display section.

Further, in the display according to the present invention, the memory further stores shift timing data stating time from receiving the frame cycle start packet to generating the blank signal. The control section generates the blank signal based on the shift timing data after receiving the frame cycle start packet. Accordingly, high inrush current at turn-on of the light emitting elements can be scattered to each of the lines.

Further, the display unit according to the present invention, wherein the memory has two or more image data memory areas storing the display data per frame, and while displaying image in the display section based on the display data stored in one of the image data memory areas, stores the display data received by the communication section into the other image data memory areas. Accordingly, the display can have enough time to receive display data.

Furthermore, a communication circuit according to the present invention comprises, a first communication section having a first transmitting section and a first receiving section, a second communication section having a second transmitting section and a second receiving section, a communication control section controlling communication of the first communication section and the second communication section respectively, receiving processing section performing receiving process based on received communication data. The first communication section and the second communication section discriminate predetermined communication data. If either the first communication section or the second communication section receives the predetermined communication data, the communication control section controls to input the communication data received by one of the communication sections receiving the predetermined communication data to the receiving processing section, and to input the communication data received another communication sections to the transmitting section of one of the communication sections receiving the predetermined communication data without inputting the communication data received by another communication sections to the receiving processing section.

Further, the communication circuit according to the present invention comprises a response processing section which performs transferring process of the communication data, a first selector which connects either the second receiving section or the response processing section with the first transmitting section, a second selector which connects either the first receiving section or the response processing section with the second transmitting section, a third selector which connects either the first receiving section or the second receiving section with the receiving processing section. The communication control section controls the first selector and the second selector to control to input the communication data received at either the first or second communication sections which has received the predetermined communication data into receiving processing section and the transmitting section of the communication section based on signal indicating either the first or second communication section has received predetermined communication data, and controls third selector to control to input the communication data received by the other communication sections receiving the predetermined communication data to the transmitting section which received the predetermined communication data without inputting the communication data into the receiving processing section. Accordingly, bi-directional communication is utilized by simple circuitry.

Further, in the communication circuit according to the present invention, the first receiving section and the second receiving section receive converting input serial communication data into parallel data, and the first transmitting section and the second transmitting section transfer with converting input parallel data into serial communication data. Accordingly, signal disturbance caused by delay at element of received communication data can be corrected. In addition, the receiving process section can perform processing at a high rate.

Furthermore, a display unit according to the present invention has the above-mentioned communication circuit. The display unit further comprises a display section constituted by at least one light emitting elements, a communication circuit communicating display data, a memory storing at least one frame of the display data based on the display data received by the communication circuit.

Furthermore, a terminal adaptor according to the present invention comprises the above-mentioned communication circuit, which is capable of communicating with other terminal adaptors connected serially. The terminal adaptor comprises a memory storing communication data received by the communication circuit, a communication section transferring the communication data stored in the memory to other terminals.

DETAILED DESCRIPTION OF THE INVENTION

To describe the invention in detail, each arrangement is described below in connection with the attached drawings.

Display Unit Communication System

Figure 1:
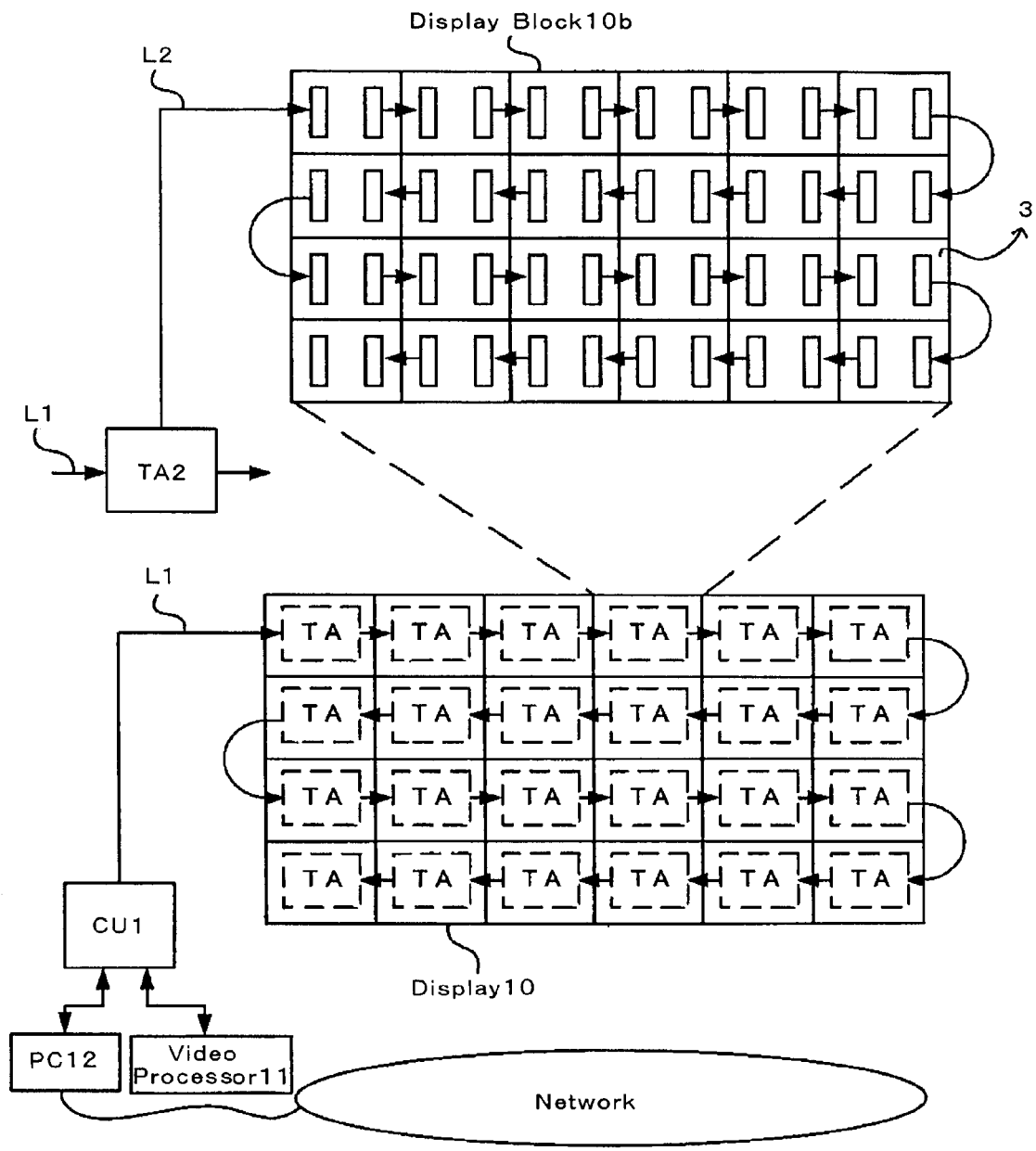
FIG. 1 is a schematic diagram showing a display unit communication system according to the present invention.
Figure 2:
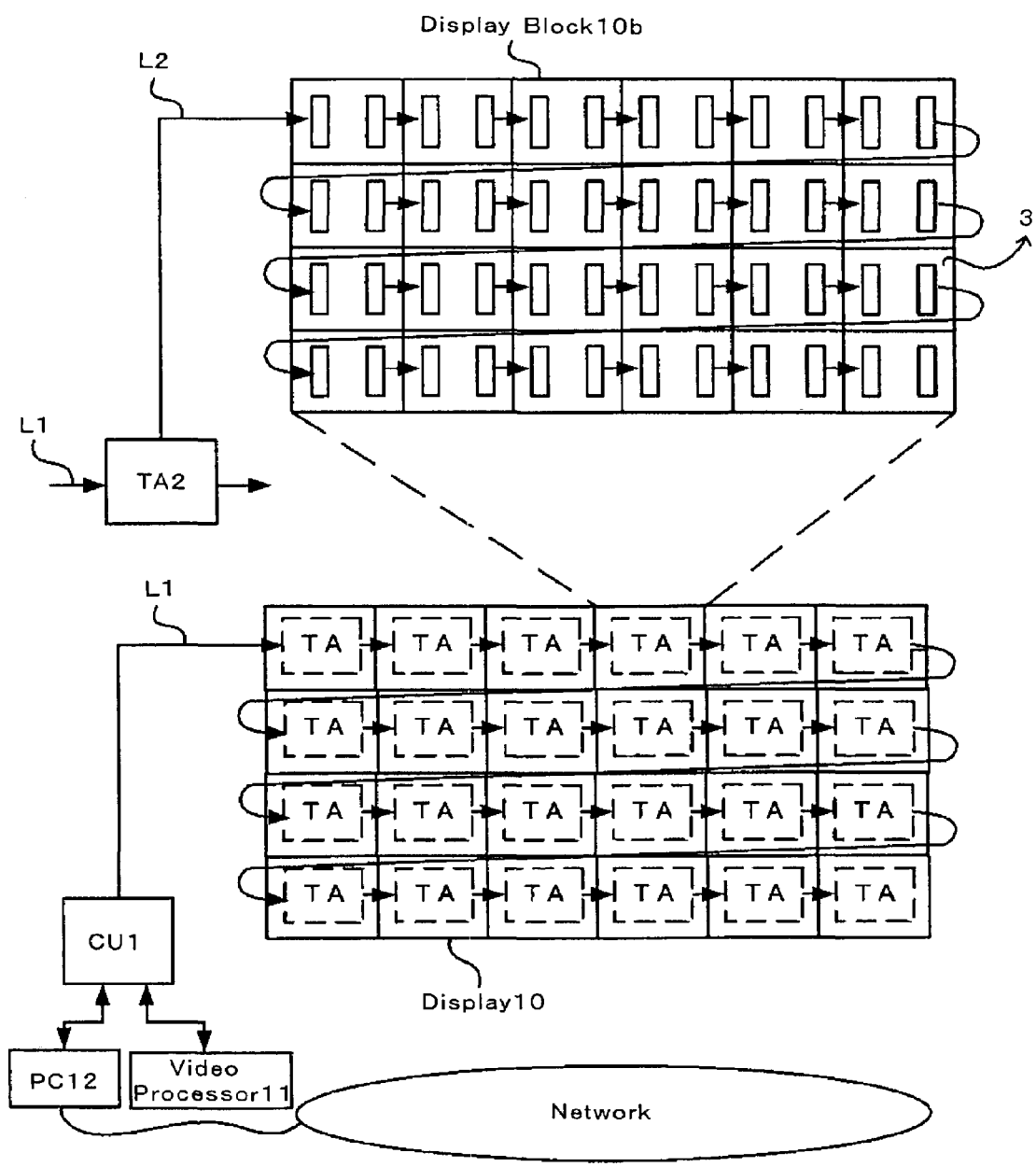
FIG. 2 is a schematic diagram showing a display unit communication system according to the present invention.

A schematic view of a lighting apparatus according to the present invention is shown in FIG. 1 and FIG. 2. In the embodiments according to the present invention described below, a communication system of display units displaying motion pictures or still pictures is described as the lighting apparatus. Reference numeral 10 denotes a display displaying based on display data such as an image to be displayed. The display 10 constitutes a display section, and is divided into a plurality of display blocks 10b. Further, a plurality of display units 3 are disposed in each of the display blocks 10b. A control unit (CU) 1 is connected with a video processor 11 providing the image source to be displayed such as display data and a computer (PC) 12 performing control of the display 10 etc. by control data respectively. The control unit also communicates with terminal adaptors (TA) 2 corresponding to the display block 10b via a first communication line L1. Furthermore, each of the terminal adaptors 2 communicates with display units 3 housed in the display block 10b etc. via a second communication line L2. In addition, the computer 12 is connected with network.

Here, the connection is composed in two hierarchical layers, in which first communication line L1 is an upper layered communication line and second communication line L2 is a lower layered communication line. Nevertheless hierarchical layers can be constituted of three layers or more than three layers. In this case, the terminal adaptors are disposed so as to correspond to the layers, while deformation of the data would be reduced, higher definition displaying would be utilized. Also, using the communication system as a lighting apparatus, the units can be disposed at various places individually as a plurality of light sources.

Connection Among the Terminal Adaptors

The terminal adaptor 2, which discriminates the display data corresponding to the display block 10b and transfers the needed display data to each of the display units 3, is disposed in the display block 10b. On the other hand, each of the terminal adaptors 2 is electrically connected in series with the control unit 1 via the first communication line L1. Besides, the connection between the control unit 1 and the terminal adaptors 2 can be applied not only to wire communication but also wireless communication. In this case, installation of the display units connected to the terminal adaptors could be more flexible.

In the case where the terminal adaptors 2 are disposed in rows, as shown in FIG. 1, the first communication line L1 connects the terminal adaptor 2 connected at an upstream position as viewed from the control unit 1 in the m-th row (m is an integer that is one or more) with the neighbor terminal adaptor 2 in the row one after another serially. Next, the first communication line L1 connects the terminal adaptor 2 connected at end of the m-th row with the terminal adaptor 2 in (m+1)-th row disposed at an opposite side position relative to the terminal adaptor 2 connected at the upstream position in the m-th row. Then, the first communication line L1 connects electrically the terminal adaptor 2 connected at an upstream position from the control unit 1 in (m+1)-th row with the neighbor terminal adaptor in the row one after another serially in a direction toward the terminal adaptor side connected at the upstream position in the m-th row. This connection of the terminal adaptors 2 is preferable.

By using the above arrangement, the first communication line L1 can be shorter for return edge of each row to be connected in the display block 10b. Especially, because the communication lines tend to be elongated for a larger size display, pulse deformation of the communication data and influence upon noise could be worse, it is therefore important to shorten the length of the communication lines. In addition, cost reduction for the communication line is another advantage.

As shown in FIG. 2, the connection can be applied such that the first communication line L1 connects the terminal adaptor 2 connected at an upstream position in each of the rows at the same side of the row. Besides, in this invention, "connecting electrically" includes, not only a physical connection by wire such as lead wire, communication line and so on, but also a data transferable connection by wireless.

Furthermore, TAID (terminal adaptor ID) to be assigned to each of the terminal adaptors 2 includes common TAID, which is received from communication unit 1 commonly by all of the terminal adaptors. To assign the TAID, automatic ID setting command data is transmitted, which is command data commanding each of the terminal adaptors to set their own TAID. The terminal adaptor 2, which received the automatic ID setting command data, computes data of control data area of the automatic ID setting command data by predetermined calculation, and then memories computed data from the predetermined algorithm as its own TAID. Then, the terminal adaptor 2 transfers the calculated data obtained by the predetermined algorithm to the next terminal adaptor 2 as control data. For example, the control unit 1 may transfer the automatic ID setting command data, which control data area is set as "0", and the predetermined algorithm may be addition "+1" to the data. Alternatively, the control unit 1 may transfer the automatic ID setting command data, which control data area is set as a maximum value, and the predetermined algorithm may be subtraction of "−1" from the data. Thus, the initial setting of the TAID can be done by the control unit according to the sequence of the connection of the first communication line L1.

Connection Among the Display Units

Likewise, the connection of each display unit 3 in the display block 10b can also be made in the same manner as the connection of the terminal adaptors. Each of the display units 3 is electrically connected to the terminal adaptor 2 via the second communication line L2 in series. The connection between the terminal adaptor and the display units or among the display units may be utilized not only by wire communication but also wireless communication, which is the same as between the control unit and the terminal adaptors. Also, wireless communication may be employed as the connection between the control unit and the terminal adaptors, and wire communication can be employed as the connection between the terminal adaptor and lower layers.

In a case where the display units 3 are arranged in rows, the second communication line L2 connects the display unit 3 connected at an upstream position as viewed from the terminal adaptor 2 in the m-th row with the neighboring display unit 3 in the row one after another serially. Next, the second communication line L2 connects the display unit 3 connected at end of the m-th row with the display unit 3 in (m+1)-th row disposed at opposite side position relative to the display unit 3 connected at the upstream position in the m-th row. Then, the second communication line L2 connects electrically the display unit 3 connected at upstream position from terminal adaptor 2 in the (m+1)-th row with the neighboring display unit in the row one after another serially in a direction toward the display unit side connected at the upstream position in the m-th row. This connection of the display unit 3 is preferable.

As shown in FIG. 2, another connection may be employed as the second communication line L2 connects the display unit 3 connected at the upstream position in each row at the same side of the row. An ID setting for display unit 3 may also be done in the same manner as the above terminal adaptor. The combination of the connection shown in FIG. 1 and the connection shown in FIG. 2 can be applied to the connection of the terminal adaptors or the display units. For example, the connection among the terminal adaptors can be applied by the connection shown in FIG. 1, and connection among the display units can be applied by the connection shown in FIG. 2. Furthermore, the direction of the connection can be made not only in the row direction, but also in a column direction or an oblique direction or the like.

The Control Unit

Figure 3:
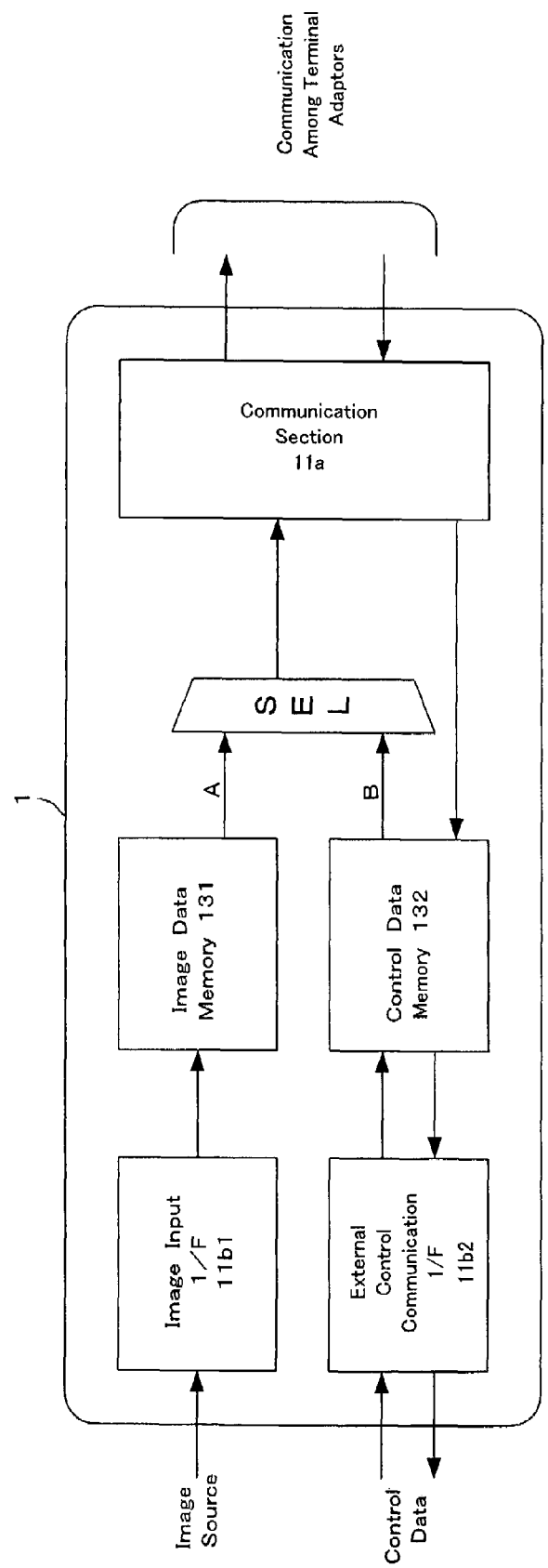
FIG. 3 is a block diagram showing a schematic of a control unit according to the present invention.

FIG. 3 is a block diagram showing a schematic view of the control unit 1. The control unit 1 receives the display data such as the image source from the video processor 11 or an image player via an image input interface 11b1, and stores the display data in an image data memory 131 as digital data by frame. Further, the control unit 1 has a communication interface 11$b$2 connected with an external control device such as the computer 12, and stores control data from the external control device in a control data memory 132. The control unit 1 controls internal control of the control unit, transfers correcting data or display unit control data or the like to the display units based on the control data stored in the control data memory 132, and further receives display unit internal information transferred from the display units 3 and so on. A communication section 11$a$ formats the image data such as the display data and control data and so on into communication format of predetermined asynchronous transmission system to communicate with the terminal adaptors, and performs communication process between the terminal adaptors.

A select circuit SEL outputs data to the communication section 11$a$ via line A, which is connected with the image data memory 131, or line B, which is connected with the control data memory 132 alternatively.

The control unit 1 precedently stores the terminal adaptor ID and the display unit ID corresponding to the display data to be displayed according to the connection of the terminal adaptors 2 and display units 3 in the control data memory.

Figure 4:
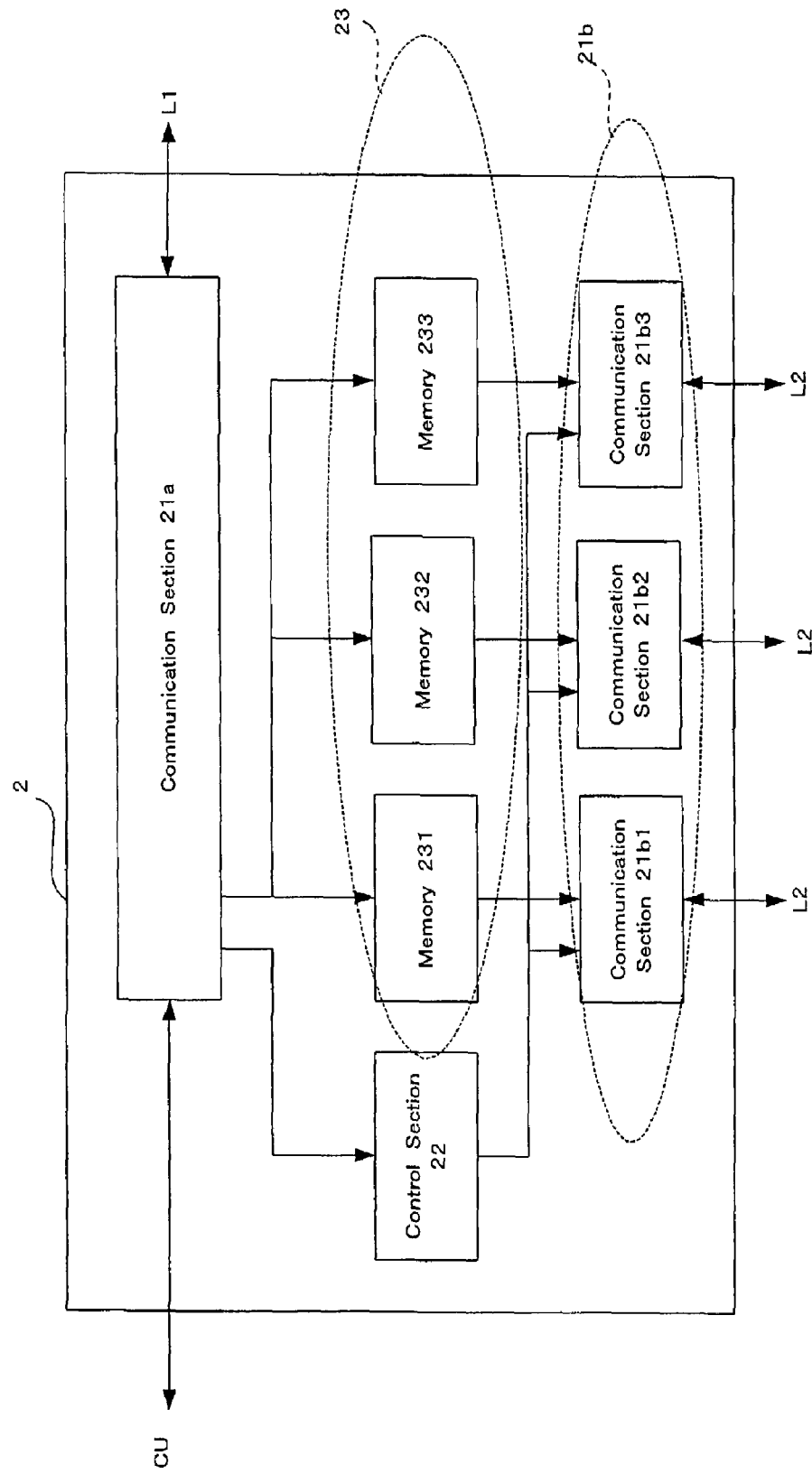
FIG. 4 is a block diagram showing a schematic of a terminal adaptor according to the present invention.
Figure 5:
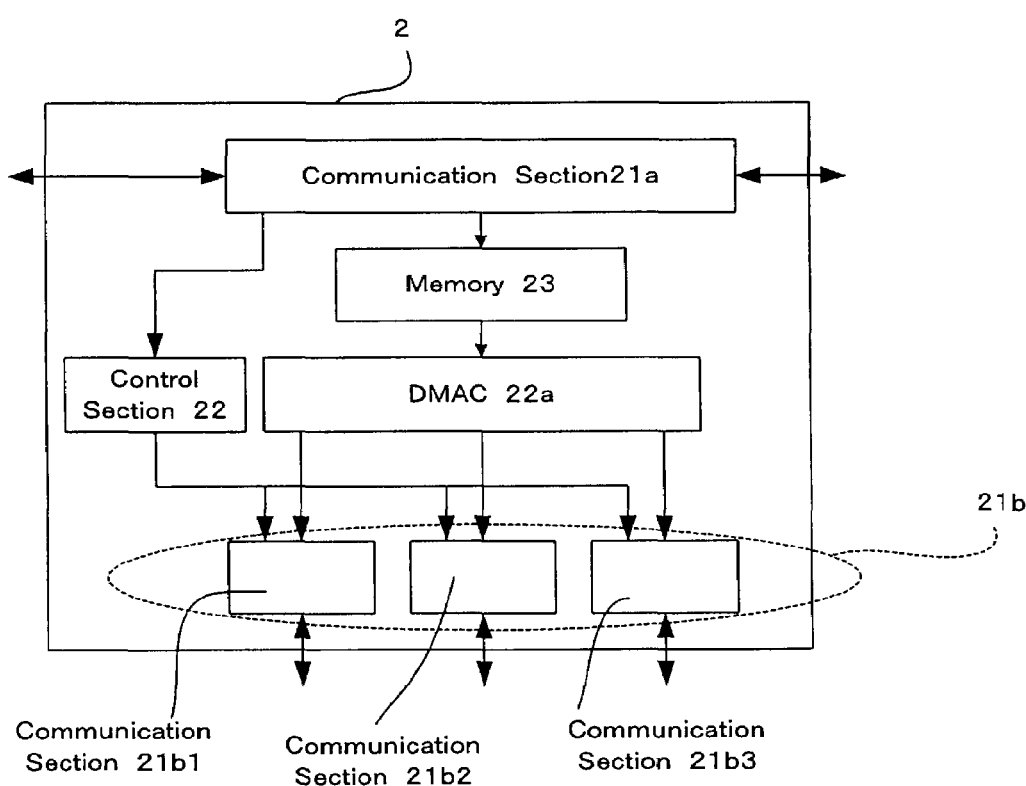
FIG. 5 is a block diagram showing a schematic of a terminal adaptor according to the present invention.

FIG. 4 is a block diagram showing an embodiment of the terminal adaptor (also called distributing process section), which has a communication section 21$b$ having a plurality of communication sections 21$b$1, 21$b$2, 21$b$3 connected with the second communication line L2. Each of the second lines is electrically connected with the display units 3 in series. The terminal adaptor side communication section 21$a$ has two communication ports, and connects between the control unit 1 and the terminal adaptor 3, or between the terminal adaptor 3 and another terminal adaptor 3. In the embodiment of FIG. 4, memory 23 is constituted by memories 231, 232, 233, correspond to each of the communication sections 21$b$1, 21$b$2, 21$b$3 of the terminal adaptor 3. Besides, as shown in FIG. 5, a common memory 23 can be employed corresponding to each of the communication sections 21$b$1, 21$b$2, 21$b$3 with memory address control section, which is constituted by direct memory access controller (DMAC) for example, controlling transmission of the data. On the other hand, control section 22 controls internal process of the terminal adaptor.

In the invention, the terminal adaptor is a device having a function, which connects lighting units such as LED etc. with the control unit controlling the lighting units directly or indirectly to distribute the data for various controls, correction, maintenances and so on via network. Especially, in the invention, packet information for lighting control of the LED units from the control unit can be transferred in packet format from the control unit to the LED units via the terminal adaptor. In this case, it is not necessary to provide several cables to control a plurality of the LED unit connected with the terminal adaptor. Particularly, it is easy that the number of the LED units can be increased or reduced spontaneously, and deformation of signal such as crosstalk of a signal line for transferring data etc. does not occur. Further, even if the number of the LED units connected per terminal adaptor or number of pixels per LED unit is increased, deformation of the display data etc. does not occur, and high definition of LED display etc. can be constituted easily.

The transfer speed between the terminal adaptor and the LED units can be set lower than between the control unit and the terminal adaptors. In this case, the transfer speed to the LED units via the terminal adaptor is set lower, so that the display can be constituted relatively easier and with a lower cost, even if the transferring cable to the LED units has a restriction such as a waterproof cable etc. Further, even the lighting block having at least one LED unit is in a remote place, the data can be transferred in high speed, so that flexibility of the design can be relatively higher. Therefore, even if the blocks having the LED units are remote, for example, one control unit can control two screens formed by the LED displays. Also, in a lighting system for illuminating an object to be illuminated from a plurality of points, flexibility of the design can be high.

Further, when the system has the control unit providing the packet information for light displaying, a plurality of the terminal adaptors connected with the control unit to perform distributing process of the packet information, and a plurality of the LED units connected with the terminal adaptors for light displaying based on the packet information, the packet information includes identifying information for the terminal adaptors and identifying information for the LED units. The control unit can transfer a predetermined part of the packet information corresponding to the display blocks having a plurality of the LED units connected with the terminal adaptor in k times (k is an integer and is 2 or more) repeatedly to each of the terminal adaptors, until all of the packet information corresponding to the entire area of the block to be light-displayed are provided. Accordingly, it is only need for the terminal adaptor to have a memory having at a least capacity of 1/k of the total packet information corresponding to the LED units connected with the terminal adaptor itself temporary. After the terminal adaptor receives the packet information whose identifying information matches the identifying information assigned to the terminal adaptor its own, the terminal adaptor transfers the packet information to a plurality of the LED units connected with the terminal adaptor itself. The LED unit has a memory having at least a capacity corresponding to the packet of the LED unit itself temporary. When the LED unit receives the packet information whose identifying information matches the identifying information assigned to the LED unit its own, the LED unit light-displays based on the packet information.

Accordingly, the memory capacity of the terminal adaptor inside can be needed only at least capacity of 1/k of total packet information of all of the LED display units connected with one terminal adaptor. Further, number of the display units, which can be connected with one terminal adaptor, is not limited by the memory capacity storing the packet information inside of the LED unit, so that the system has an advantage that connecting between the terminal adaptor and the display unit can be assembled more flexibly. Furthermore, when each of the LED units has the memory having capacity, which can store the packet information corresponding to one LED unit temporarily, the memory capacity storing the packet information of the terminal adaptor inside can be minimized, and not concerned with the connecting form of the LED units, and can be reduced drastically. Therefore, the cost of the total memories of the apparatus to store the packet information can also be reduced.

Further, it is preferable that the packet information includes the display data, which is source of image etc., and the control data controlling lighting devices such as the LED units, and that the control unit and the terminal adaptors are connected by the first communication line, which is a common communication line of the display data and the control data.

Accordingly, the memory capacity storing the packet information of the terminal adaptor inside can be reduced, so that the control unit and the terminal adaptors can be connected by the first communication line, which is the common communication line of the display data and the control data. Therefore, the number of the bus can be reduced effectively, connecting can be simple, and deformation of the data can be reduced.

Furthermore, it is preferable that the system has the second communication line connecting between the terminal adaptor and the LED unit, and transfer speed of the second communication line is lower than transfer speed of the first communication line.

Thereby, cost of the second communication line can be reduced effectively.

The Communication Section of the Terminal Adaptor

Figure 6:
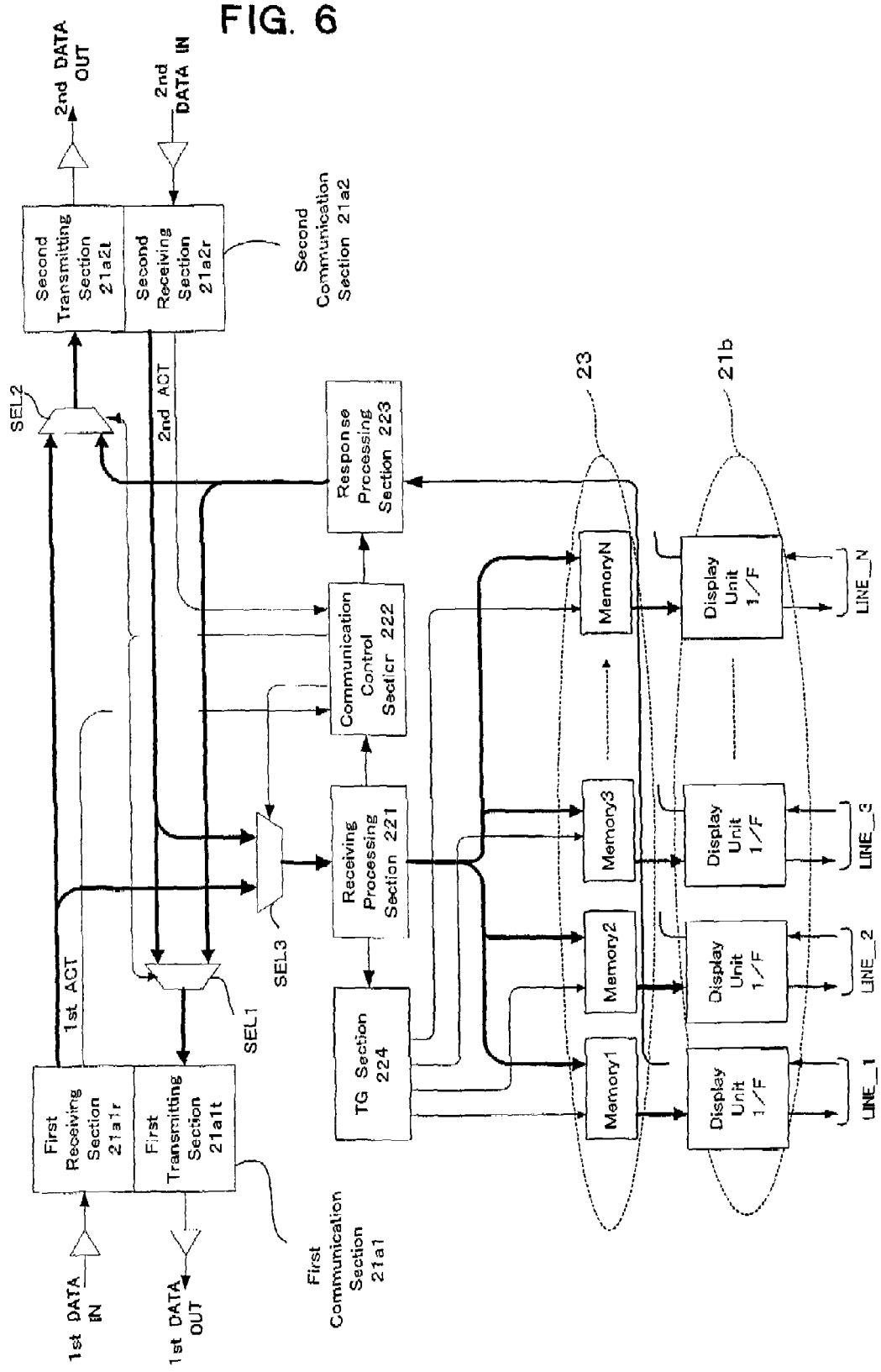
FIG. 6 is a block diagram showing a schematic of a communication section of a terminal adaptor according to the present invention.

FIG. 6 is an internal block diagram of the terminal adaptor 2. The communication section 21a of the terminal adaptor 2 has a first communication section 21a1 and a second communication section 21a2. As a preferable embodiment, the communication section is constituted as a full-duplex bi-directional operation section, which communicates in bi-directional by two kinds of the communication line, or semi-duplex bi-directional operation section, which communicates in bi-directional by common communication line. Each of the first communication section 21a1 and the second communication section 21a2 has a receiving section 21a1r, 21a2r and a transmitting section 21a1t, 21a2t, respectively. Either of the receiving sections performs receiving process of the data from the control unit 1. For example, when the first receiving section 21a1r receives the command data from the control unit 1, "1st ACT" signal turns to active, then a communication control section 222 select the received data from the first receiving section 21a1r and captures it as the command data into a receiving processing section 221. In this case, the received data from the second receiving section 21a2r is not performed receiving process, but is transferred to the first transmitting section 21 alt directly.

Further, when the second receiving section 21a2r is active, after receiving the command data, a response processing section 223 performs transferring process to the control unit 1 via the first transmitting section 21a1t. The process mentioned above is also performed similarly, when the second receiving section 21a2r receives the command data from the control unit. The communication control section 222 discriminates the received command data from either of the receiving sections based on the "1st ACT" signal and "2nd ACT" signal, and controls a selector SEL3 selecting the receiving process and selectors SEL1, SEL2 selecting transmitting section to transfer the response data of the control unit from the response processing section 223. Thus, the bi-directional communication control of the terminal adaptor can perform the receiving process whichever the first or the second communication ports receives the command data from the control unit 1, and thus the system having more flexible connecting form of the display block 10b can be constituted.

Next, after the receiving process, transferring the display data and the control data from the terminal adaptor 2 to the display unit 3 is described. Each of the terminal adaptors 2 can communicate with the display units via a plurality of the second communication lines L2. In the embodiments of FIG. 4 and FIG. 5, the terminal adaptor has three communication ports connected with the second communication line L2, an embodiment of FIG. 6, shows the terminal adaptor has N communication ports, which are display unit interfaces (display unit I/Fs). LINE_1, 2, 3 . . . LINE_N show number of connecting second communication line L2, every line controls within predetermined number of the display units. Memories 1–N corresponding to each line store the display data to be displayed by the display units connected with them. The terminal adaptor 2 stores the display data corresponding to one frame in from memory 1 to N in accordance with receiving sequecy. After receiving display data corresponding to one frame, the display data interfaces LINE_1 to LINE_N transfer the display data at the same time based on predetermined synchronizing signal to the second communication line L2. Number of the display units to control per one line is determined based on transfer speed, amount of the display data to be needed for one display data for displaying. For example, when one line can control M units, the number of the display units to be able to control per one terminal adaptor is calculated by N×M. Further, a TG section 224 performs timing control.

The terminal adaptor 2 is set TAID in initial setting precedently, stores the TAID its own, and receives received data selectively based on the TAID.

The Display Unit

Figure 7:
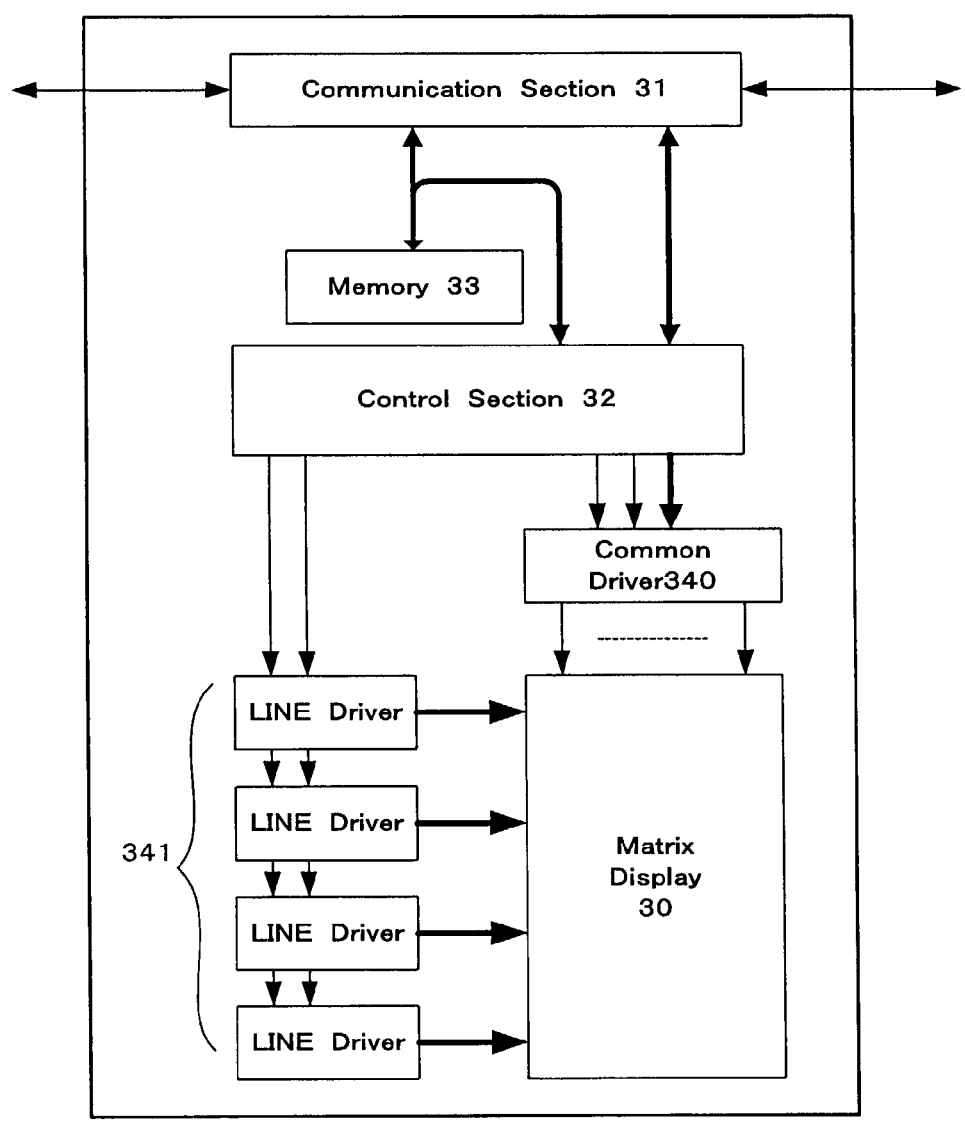
FIG. 7 is a block diagram showing a schematic of a display unit according to the present invention.

FIG. 7 is a block diagram showing a schematic representation of a display unit 3. A communication section 31 of the display unit side has two ports similar to the communication port 21a of the terminal adaptor, and performs bi-directional communication process. In the display unit 3, the display data and the control data and so on are allocated to predetermined memory space in the memory 33 corresponding to circuit configuration of the internal display unit. It performs control of the display unit 3, which part of the memory space is accessed, or which data area of the memory space is written or read, to control from the control unit 1 to the display unit 3.

When the command data received by the display unit 3 has the display data, the display unit 3 stores the display data into the memory 33, and after receiving, control section 32 reads the display data. Then, according to line control of a common driver 340, the control section 32 transfers the display data for displaying to each of line drivers 341 synchronously. Line control by the common driver 340 drives the displaying elements row of each line of the display (Matrix Display) 30 by changing each of the common lines sequently in predetermined cycle. In this case, the data to be displayed in each line is allocated every line in the memory; the control section 32 reads the display data corresponding to line data for displaying from the memory 33. Further, the display unit 3 is not always constituted as the matrix display; the system can be constituted with an illumination changeable lighting device controlled by an external control device.

Figure 8:
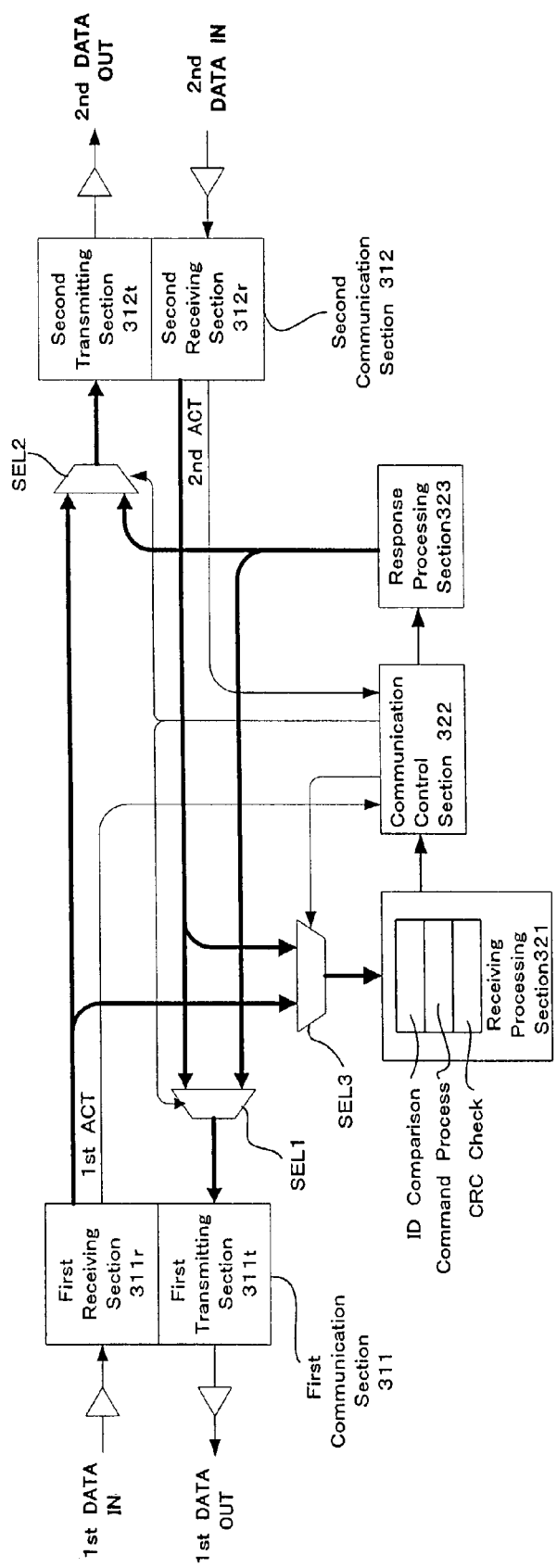
FIG. 8 is a block diagram showing a schematic of a communication section of a display unit according to the present invention.

FIG. 8 is a block diagram showing the communication section 31 of the display unit 3. The command data, which is serial data transferred from the terminal adaptor 2 to each display unit 3, is converted into parallel data in a first receiving section 311r, then input to a receiving process section 321. The receiving process section 321 discriminates whether the identifying information of the input command data matches stored ID for the display unit or not. When the ID agrees, the receiving process section 321 performs receiving process based on the command data. Further, when the receiving process section 321 judges that an error occurs in the input command data, transfers response data, which informs that the error has occurred in communicating the command data, to the control unit 1 via a communication control section 322 and a response processing section 323.

In addition, when the command discriminated in the receiving process section 321 needs to respond to the control unit 1, the receiving process section 321 transfers the response data to the control unit 1 based on the command data similarly. In this case, the response data is transferred to the control unit 1 from the receiving process section 321 with code to judge an error of header section, header section CRC to judge an error of data section, and data section CRC.

The Command Control

Figure 9:
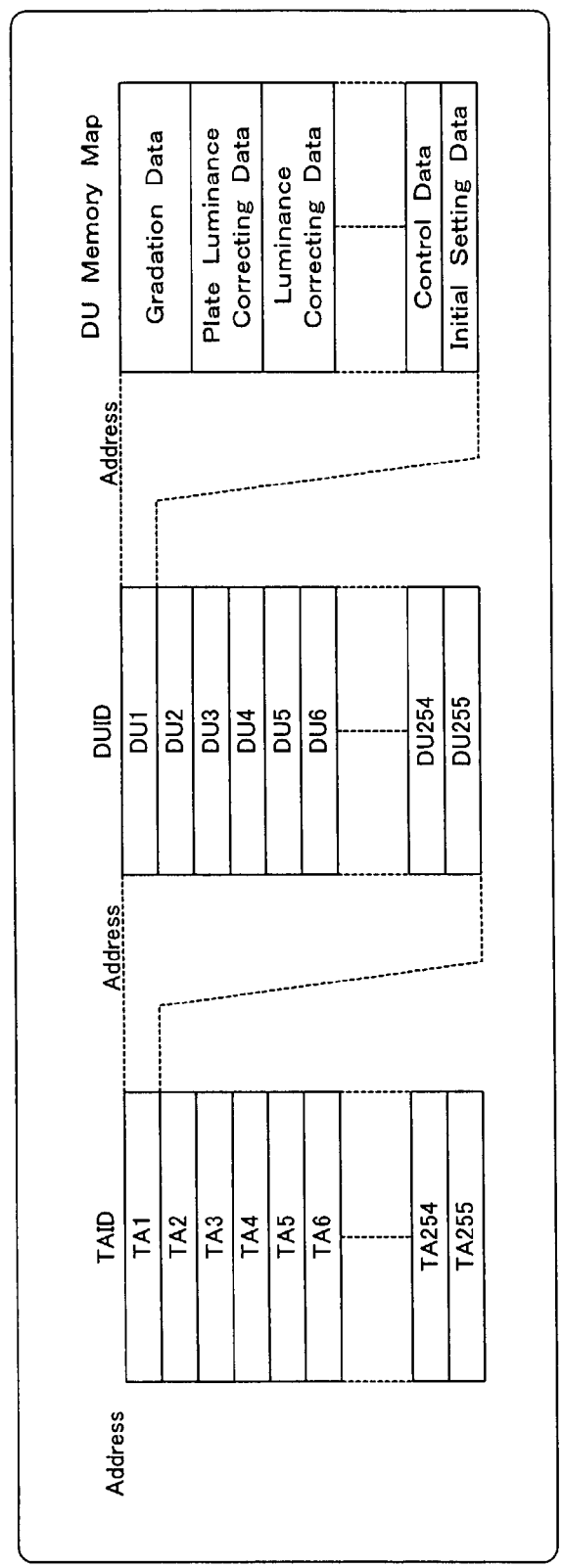
FIG. 9 is a display unit control address space of a display unit communication system according to the present invention.

FIG. 9 is an embodiment of allocation of display unit control address space. In view from the control unit 1 to the terminal adaptor 2 and the display unit 3, the control memory space is expressed as shown in FIG. 9, transferring the data to the display unit to be need is performed by discriminating which address space of the control address space corresponds to the data. The control address space is constituted with TA control address space discriminated by TAID, display unit control address space discriminated by display unit ID (DUID) in each of the terminal adaptor 2, and DU memory map allocated in each of the display units. The DU memory map depends on performance and function of the display unit such as matrix constitution, gradation bit width, whether the display unit needs correcting data or not, and so on. Accordingly, the control unit 1 controls display of the display, based on recognition of type of the display unit 3 in advance.

Here, the terminal adaptor ID (TAID) can be set 1 to 255, the display unit ID (DUID) can be set 1 to 255, for example, TA0 of the TAID and DU0 of the DUID can be set as common ID for all of the terminal adaptors and common ID for all of the display units. Further, in this embodiment, the address space corresponding to the memory 33 of the display unit 3 is constituted by gradation data corresponding to the display data, plate luminance correcting data, luminance correcting data, and control data and initial setting data.

Format of the Command Data (Control Data)

Figure 10:
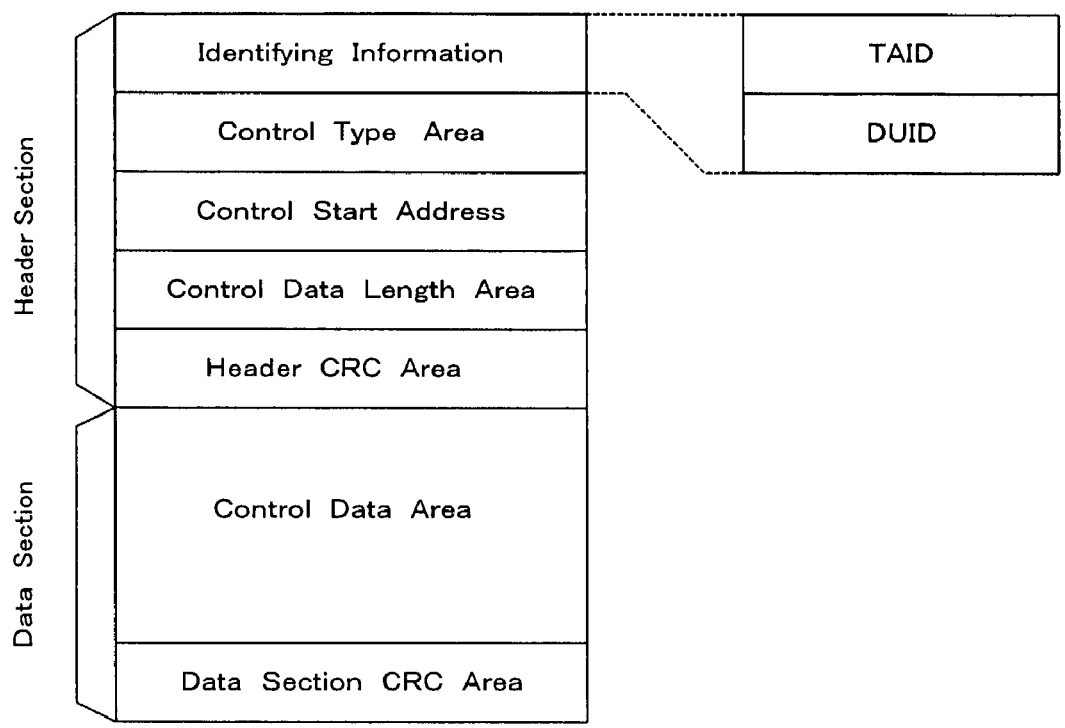
FIG. 10 is a data configuration of a command data packet according to the present invention.

FIG. 10 shows a data configuration of the command data packet transferred from the control unit 1 to the terminal adaptors 2 or the display units 3. The command data packet is constituted by header section and data section. The header section is constituted by identifying information area stating destination, control type area stating content of the control, control start address area allocating address to be written data of the data section, control data length area stating length of the data section, and header CRC area to check communication error of the header section. For example, the identifying information area has the terminal adaptor ID (TAID) stating destination of the TA and the display unit ID (DUID) stating destination of the display unit connected with the terminal adaptor. When these are layered, identifying information corresponding to the layer can be set and assigned additionally. For example, in the control type area, code such as initial ID setting, image displaying control, frame synchronizing control, correcting data control, management control etc. is assigned. The control type area can include all the control contents in each of the command data uniformly, or only data of the control content to be needed.

The control data area and data section CRC area to check communication error of data section constitutes the data section. Display data to be needed to display in the each of the display unit, ID to be set to each of the terminal adaptor and the display unit in the initial setting etc. are assigned as data of the data area.

Format of the Command Data (Control Data)

Figure 11:
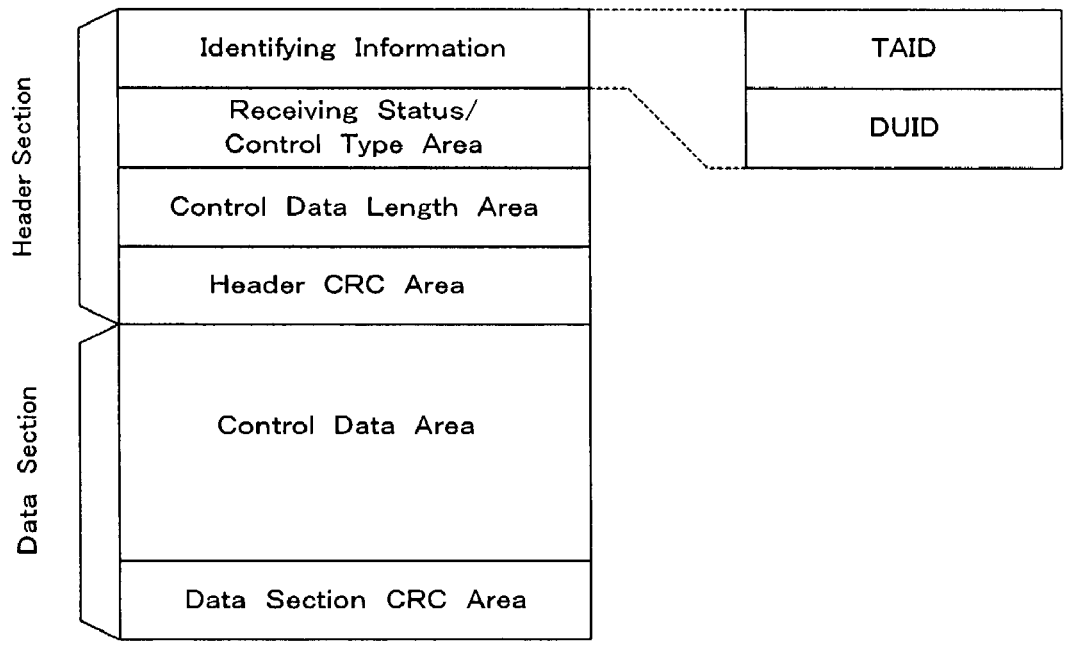
FIG. 11 is a data configuration of a response data packet according to the present invention.

FIG. 11 shows a data configuration of the response data packet transferred from the terminal adaptors 2 and the display unit 3 to the control unit 1. The response data packet is also constituted by header section and data section. The header section is constituted by identifying information area stating its own terminal adaptor ID (TAID) or display unit ID (DUID), receiving status/control type area stating receiving status, data length area stating length of the header section, and header CRC area to check communication error of the header section. For example, code of self-diagnosis, internal setting data transferring, receiving status of correcting data transferring etc. are assigned in the receiving status/control type area. The control data area and data section CRC area to check communication error of data section constitutes the data section. Self-diagnosis data, internal setting data, correcting data etc. are assigned as data of the data area.

Display Displaying Control as an Embodiment of the Lighting Control

Next, a communication method of the display data transferring from the control unit 1 to each of the display units 3 is described. When the image changes in video rate (for example 60 Hz), the control unit 1 transfers frame cycle start packet (csp) stating start of frame cycle to all of the display units via the terminal adaptors 2 every Vsync signal stating start of the frame. Each of the display units receiving the frame cycle start packet (csp) performs frame synchronizing in the each of the display units.

After transferring the frame cycle start packet (csp), the control unit 1 transfers display data packet (ddp) assigned the display data to be displayed at each of the display units in the data section to each of the display units via the terminal adaptors 2. The display data packet (ddp) includes information to determine action of the display unit such as image, which is motion pictures, still pictures etc. to be displayed at the display unit, or lighting information etc. when the display unit is used as lighting. Each of the terminal adaptors receiving the display data packet (ddp) compares the TAID included in the identifying information with its own terminal adaptor ID (TAID), and stores the display data packet (ddp) into the memory 23 when both of the TAID agree. Further, Each of the terminal adaptors 2 receiving the display data packet (ddp) transfers the display data packet (ddp) stored in the memory to each of the display units 3 connected with each of the terminal adaptors 2. Then, each of the display units 3 receiving the display data packet (ddp) compares the DUID in the identifying information with its own display unit ID (DUID), and performs receiving process when both of the DUID agree.

The display data transferred to each of the display unit 3 is stored into the memory 33 in each of the display units 3, and controlled for displaying. Thus each of the display units displays the image based on the display data distributed by the control unit 1, so that display 10 can displays the image totally.

Connection Among Deferent Type Units

Figure 12:
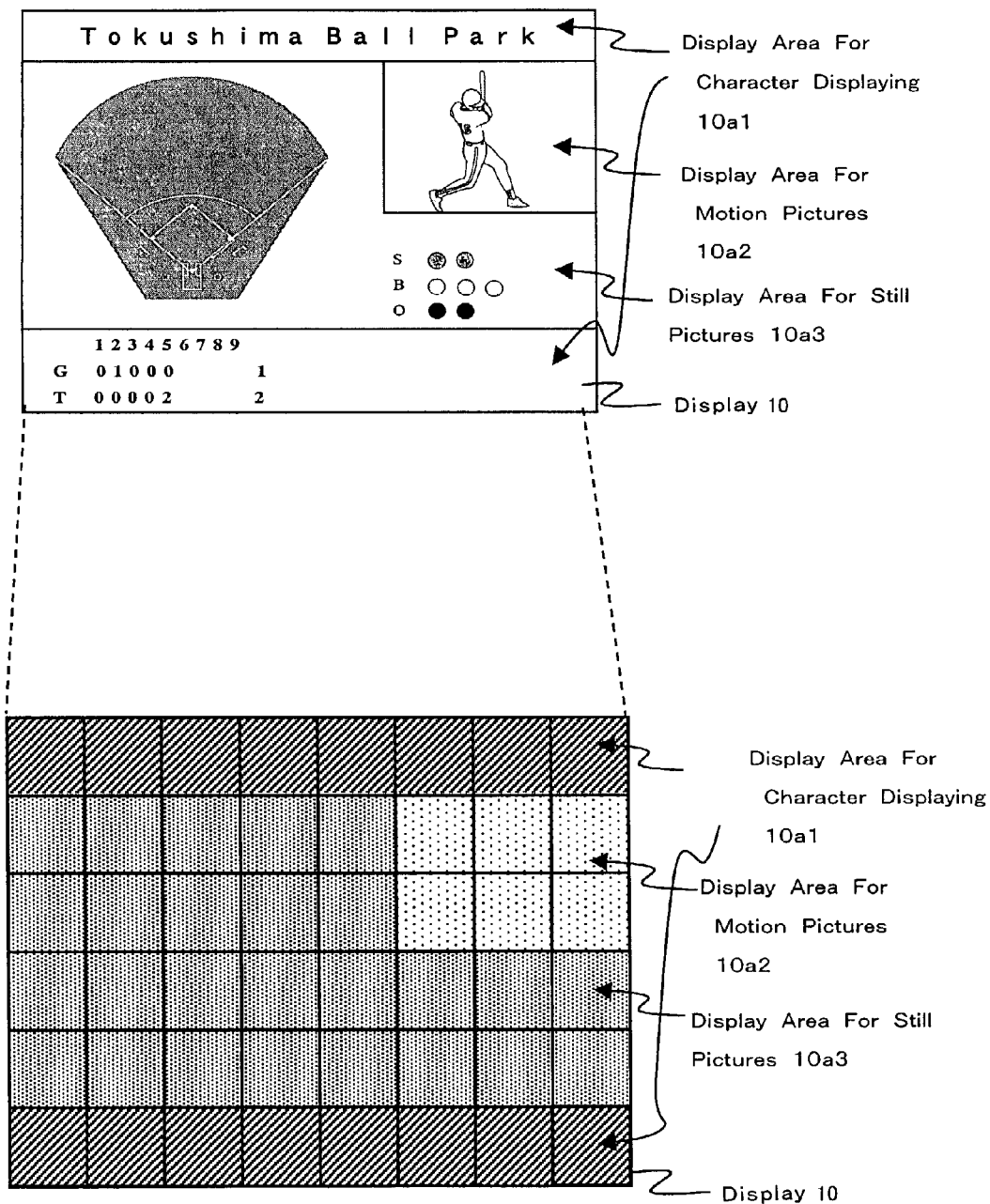
FIG. 12 is a schematic diagram of a display unit communication system according to the present invention, which has a display divided into display areas having different displaying way.

FIG. 12 shows a schematic diagram of the display unit communication system, which has the display 10 divided into a plurality of display areas 10a displaying the image by a displaying way corresponding to each of the divided display areas 10a. By transferring the command data with data format corresponding to each of the divided display areas 10a to each of the display units 3, one control unit 1 can control image displaying of each of the display areas 10a. For example, the display 10 is divided into display area for character displaying 10a1, display area for motion pictures 10a2, and display area for still pictures 10a3, which have deferent displaying ways, and can display the image in display units disposed in the areas corresponding to the areas.

As one embodiment, display units that have matrix having 24×24 (24 rows 24 columns) pixels with 2 bit every RGB color tones, or 4 gradation displaying, display units that have dot matrix having 16×16 with 8 bit every RGB color tones, or 256 gradation displaying, and display units that have dot matrix having 16×16 with 10 bit every RGB color tones, or 1024 gradation displaying are connected in the display area for character displaying 10a1, display area for motion pictures 10a2, and display area for still pictures 10a3 respectively.

Although, each of the display areas 10a is not necessary to set corresponding to the display blocks units, it is preferable to set each of the display areas 10a corresponding to the display blocks units for displaying control.

Communication Among Deferent Type Units

The data length of the command data with data format corresponding to each of the divided display areas 10a is set by control data length area corresponding to number of the displaying gradation, matrix structures of the pixels, content color tones of one pixel and so on, and data to be needed to display in each of the display units is assigned into the control data. Further, code stating structure of the data can be assigned in a part of the control type area. Thus, one control unit 1 can control displaying of the display unit communication system with display units having deferent displaying gradations.

For example, in the case that the video rate (frame cycle) is 60 Hz, serial transferring bit rate among the display units is 20 Mbps, the matrix structure of each of the display units is 16×16 having pixels with RGB color tones LED per pixel, when the displaying gradation is 10–16 bit, maximum number of connecting units is 24, when in the displaying gradation is 6–8 bit, maximum number of connecting units is 48, when in the displaying gradation is 4 bit, maximum number of connecting units is 96, when in the displaying gradation is 2 bit, maximum number of connecting units is 192, when in the displaying gradation is 1 bit, maximum number of connecting units is 384, so that maximum number of connecting units can be variable. Further, to change communication way among the display units to TTL, TIA/EiA422B, TIA/EIA644B (LVDS), TIA/EIA568A etc., for example, serial transferring bit rate and transferring distance can be variable properly. Further more, to select data compression way corresponding to displaying type properly, maximum number of connecting units can increase more.

Connection of Three-dimensional Units

Figure 13:
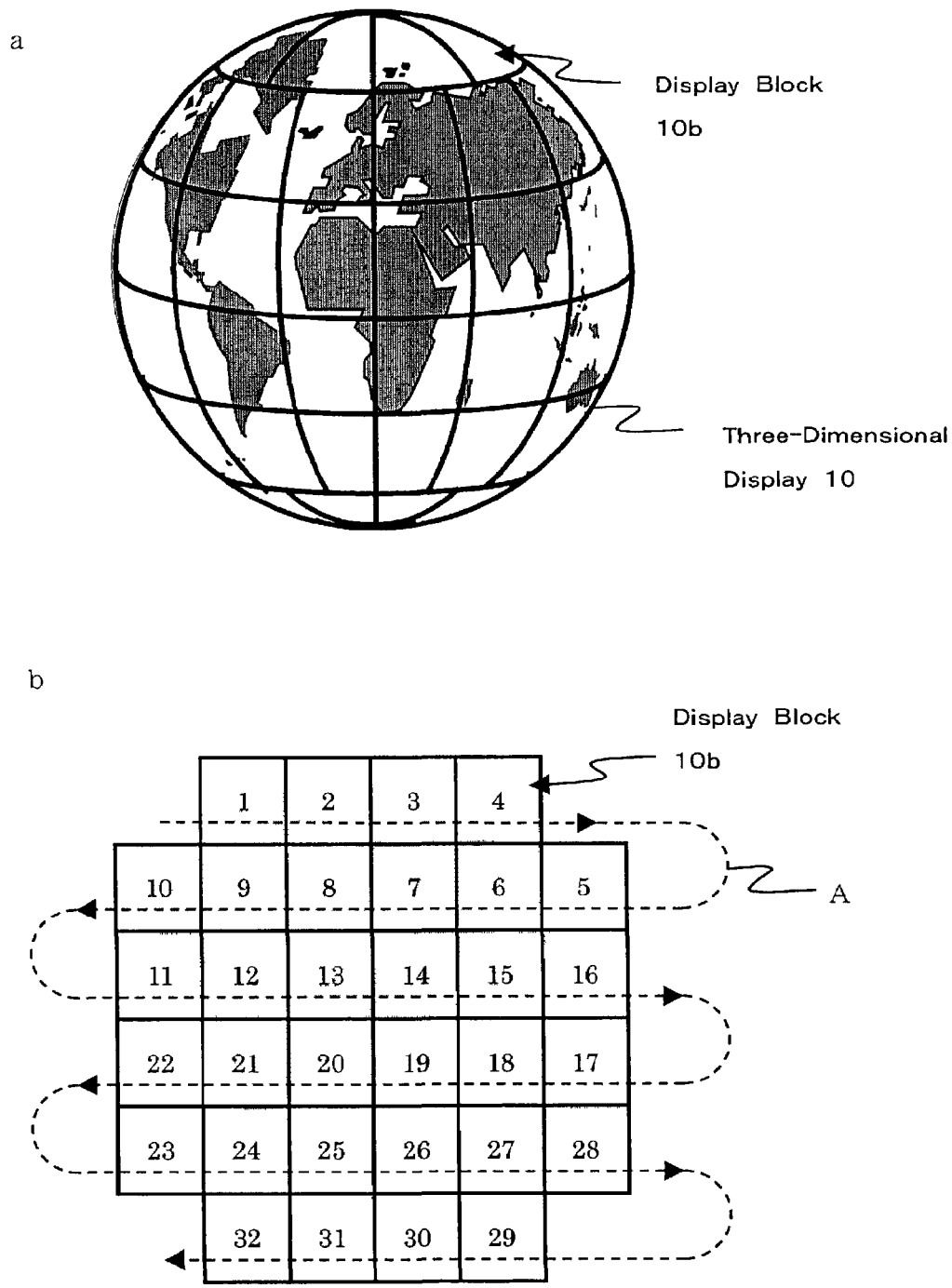
FIG. 13 is a schematic diagram of a display communication system according to the present invention applying to a spherical three-dimensional display.

FIG. 13 shows an embodiment of a spherical three-dimensional display 10, to which the display communication system according to the present invention applies. Here, the spherical three-dimensional display 10 is divided into display blocks 10b every rows, each number of display blocks 10b of the rows is not necessary to be same number. In the embodiment of FIG. 13, first and sixth row of the display are divided into four display blocks respectively, second to fifth row are divided into six display blocks 10b. Further, each of the display blocks is not necessary to be same pixel matrix structure, pixel number and pixel arrangement of display units 3 can be designed corresponding to shapes, position or the like properly. FIG. 13b is a general schematic of the spherical three-dimensional display 10 of FIG. 13a, which is spread by the display block 10b.

As shown arrow with dotted line in FIG. 13, the TAID corresponding to the display block 10b are assigned from the terminal adaptor 2 connected at upstream position from the control unit 1 in m-th row to the neighbor terminal adaptor 2 in the row one after another serially with increment by one, similar to connection of the first communication line L1 among the terminal adaptors 2 described above. Next, the TAID are assigned from the terminal adaptor 2 connected at end of the m-th row to the terminal adaptor 2 disposed in (m+1)-th row at opposite side position against the terminal adaptor 2 connected at the upstream position in the m-th row. Then, the TAID are assigned to the neighbor terminal adaptor in the row one after another serially in direction toward the terminal adaptor side connected at the upstream position in m-th row with increment by one.

In the embodiment of FIG. 13b, the TAID of left end display block in the first row is assigned 1, and 2, 3, 4 are assigned toward right direction one after another. Next, the TAID of the display block in the second row disposed at opposite side position against the display block assigned 1 in the first row is assigned 5, and 5, 6, 7, 8, 9, 10 are assigned toward left direction, which is a direction toward the display block assigned 1 in this case, one after another. Similarly, the TAID are assigned 11–16 from left to right direction in the third row, 17–22 from right to left direction in the forth row, 23–28 from left to right direction in the fifth row, 29–32 from right to left direction in the sixth row, one by another.

Number of the display unit 3 divided in each row in each of the display block 10b is not necessary to be same, similar to dividing into display blocks 10b, and method to add ID can be employed similar to the TAID, which is ID of the display unit 3. Further, pixel number of each display unit 3 is not necessary to be same, pixel number and pixel arrangement can be designed corresponding to shapes, position or the like properly.

Communication of Three-dimensional Units

The command data with data format corresponding to each of the divided display blocks 10b is distributed to each of the display blocks 10b by the TAID corresponding to the display blocks 10b, so that displaying control can be achieved even number of the connected display blocks 10b per row is not constant. In the command data, data length stating area DL states necessary data length corresponding to displaying gradation number, pixel arrangement, pixel number, color tone number per pixel or the like; data to be needed to display in each of the display units is assigned to control data. Further, code stating data structure assigned in the control data can be assigned in a part of the control type area. Thus, even number of the connected display blocks and display units per row is not constant in the display communication system, one control unit can control to display.

Management System

Further, it can perform control and monitor of each of the display units 3 via the information process apparatus connected with the control unit 1 that each of the display units 3 has function to monitor of driver improperness, improperness such as disconnection, communication improperness, temperature or the like, and to inform data corresponding to each of the function as the response data to the control unit 1.

For example, the computer 12 etc. connected with the control unit 1 can performs control of the each of the display units 3, terminal adaptors 2, power source or the like, and monitor based on improperness of constant current output, improperness of temperature of internal driver IC, various interference information such as frame synchronizing interference, internal setting information such as resister information of control section of the display unit 3, temperature monitor information stating temperature of surface of driver substrates in the display units 3, or power source monitor information monitoring voltage of the power source to the display units 3.

Although the display unit communication system is described below as a more concrete embodiment according to the present invention applied with asynchronous transfer mode (ATM) for transferring thereinafter, the present embodiment is illustrative and not restrictive. In this embodiment, communication of the first communication line among the terminal adaptors employs higher speed communication than communication of the second communication line among the display units. Here, it is described that an embodiment employs LED display units as the display units 3 and serial communication in each of communication.

Further, the first communication line L1 communicates in broadband communication with cable for high speed transmission among the terminal adaptors, and the second communication line L2 communicates with cable for low speed transmission among the display units in each of the display blocks, so that it can communicate among the terminal adaptors in long distance transmission and connect each of the display blocks flexibly without cost up.

A Control Unit

The control unit 1 receives the display data such as the image source from the video processor 11 or the image player via the image input interface 11$b$1, and stores the display data such as image data in the image data memory 131 as digital data by frame. Further, the control unit 1 has the communication interface 11$b$2 connected with the external control device such as the computer 12, and stores control data from the external control device in the control data memory 132. The control unit 1 performs internal control of the control unit, transfers brightness correcting data, display unit control data etc. to the display units based on the control data stored in the control data memory 132, and further receives display unit internal information etc. transferred from the display units. The communication section 11$a$ formats the display data and control data into predetermined communication format to communicate with the terminal adaptors 2, and performs communication process between the terminal adaptors 2.

The control unit 1 receives digital data from the video processor 11, which is image data, or digital data analog/digital-converted from analog data as the display data at the image input interface 11$b$1, and stores the display data in the image data memory 131. Further, the control unit 1 receives the control data at the communication section 11$b$2, and stores in the control data memory 132.

The control unit 1 transfers the command data such as frame cycle start packet (csp) and the display data packet (ddp) based on the display data stored in the memory 131. At that time, the communication section 11$a$ converts the data to be transferred into packet format of the ATM communication of data-strobe system, and transfers it. Further, communication section 11$a$ converts packet format data of the ATM communication of data-strobe system transferred from the terminal adaptors 2 and the display units 3 into parallel data, and inputs to the control data memory 132.

Terminal Adaptors

The terminal adaptor 2 is constituted by the communication section 21$a$ to communicate with the control unit 1 or the other terminal adaptors, the communication section 21$b$ to communicate with the display units 3, the memory 23 to store communicated data etc. and control section 22 to write and read in the memory 23 and to performs internal control. The terminal adaptor 2 is set the TAID in initial setting precedently, stores its own TAID, and receives received data based on the TAID selectively. Then, the terminal adaptor 2 transfers the received data to the display units 3 connected with the terminal adaptor. Further, when the terminal adaptor 2 has a plurality of the display unit interfaces, the terminal adaptor 2 discriminates which display unit interface should transfer the data.

LED Display Units as the Displaying Devices

Figure 14:
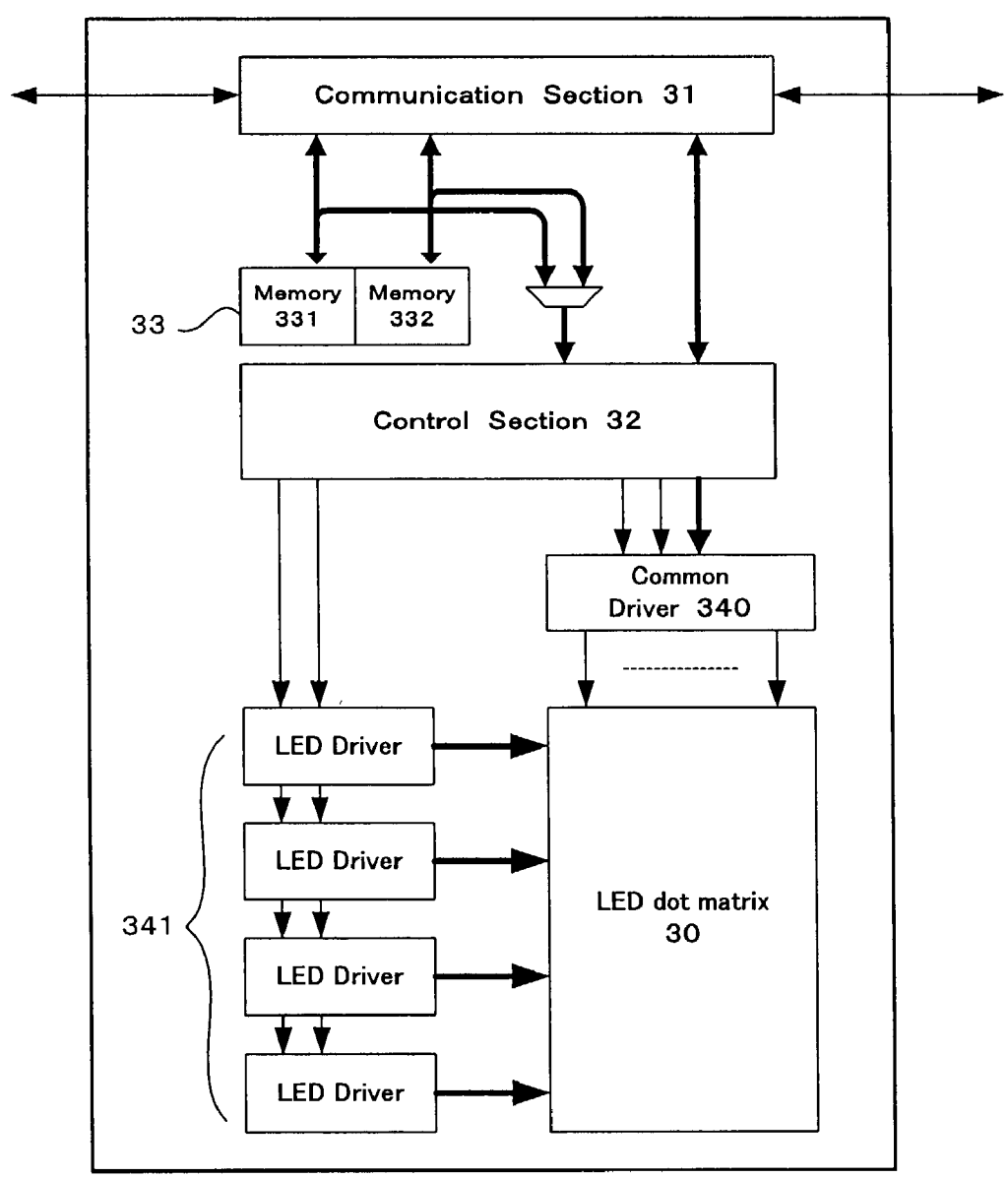
FIG. 14 is a block diagram showing a schematic of an LED display unit according to the present invention.

FIG. 14 is a block diagram showing a schematic of the LED display unit. The communication section 31 has two ports similar to the communication section 21$a$ of the terminal adaptor, and performs bi-directional communication process.

In the display unit 3, image data such as the display data, brightness correcting data, the control data and so on are allocated to predetermined memory space in the memory 33 corresponding to circuit configuration of the internal display unit. It performs control of the display unit 3, which part of the memory space is accessed, or which data area of the memory space is written or read, to control from the control unit 1 to the display unit 3.

When the DUID received command data at the communication section 31 of the display unit 3 matches stored its own DUID, the control data of the command data is written into memory area designated by the control address and control data length.

When the command data has the display data, the display unit 2 stores the display data corresponding to one frame in the memory, after receiving, the control section reads the display data. Then, the display data to be displayed is transferred to LED drivers 341 with synchronizing with line control of a common driver 340. The line control of the common driver drives LED of each line by changing each of common line in predetermined cycle one by after. At that time, the data to be displayed in each line of the memory is allocated corresponding to each line, the control section 32 reads the display data corresponding to line to be displayed from the memory 33.

Thus, the image is displayed in matrix display 30 of the display unit 3 by driving the pixels. In the embodiment, one example of the LED display 3 is shown that one common driver and four LED drivers drive pixels constituted by a plurality of dots, which are LEDs corresponding to RGB.

Figure 15:
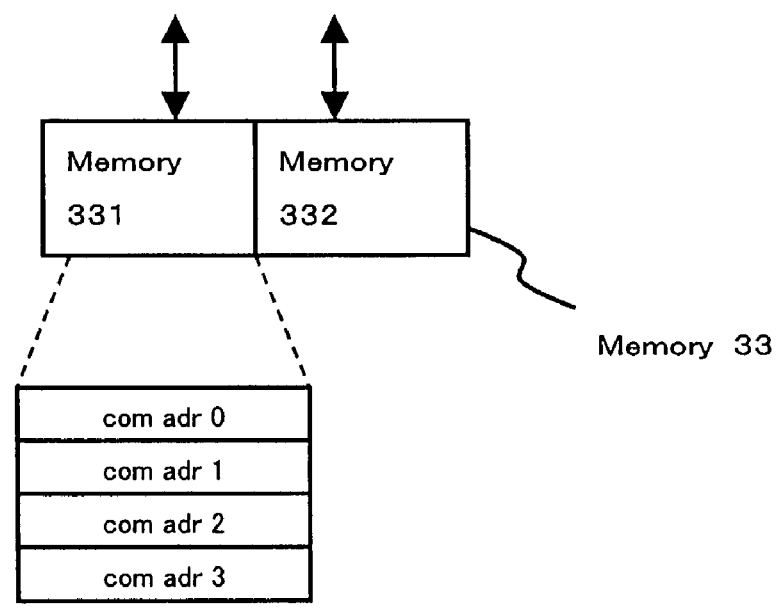
FIG. 15 is a schematic diagram of a memory area of a memory space of a memory of an LED display unit according to the present invention.

In the embodiment, the memory 33 of the LED display unit 3 has by two memory areas 331, 332. The two memory areas can be constituted by two SRAMs, for example. The memory stores display data in alternative memory areas every one frame by turns. As shown in FIG. 15, each of memory areas has memory areas com adr 0, 1, 2, 3 to store the display data corresponding to the common address. During image based on the display data stored in one of memory areas is displayed in the LED display unit 3 in the one frame cycle, the display data to be displayed in next frame cycle is received as the command data, and stored into another memory area. In addition, the LED display unit can have a further memory such as EEPROM to store the its own TAID set precedently, brightness correcting data for each of the LED and so on.

Command Control

The control unit 1 transfers data to be transferred to the display unit to be controlled by discriminating which part of the control memory space corresponds to the terminal adaptor 2 and the display unit 3 in view from the control unit 1.

The control address space is constituted by TAID control address space discriminated by the TAID, display unit control address space discriminated by the DUID in each of the terminal adaptors 2, and DU memory map allocated in each of the display units 3. The DU memory map is varied in dependence on performance and function of the display unit 3 such as matrix constitution, gradation bit width, whether the display unit needs correcting data or not or the like. Accordingly, the control unit 1 controls displaying of the display, after discriminating type of the display unit 3 precedently.

Image Displaying Control of the Display Unit

Figure 16:
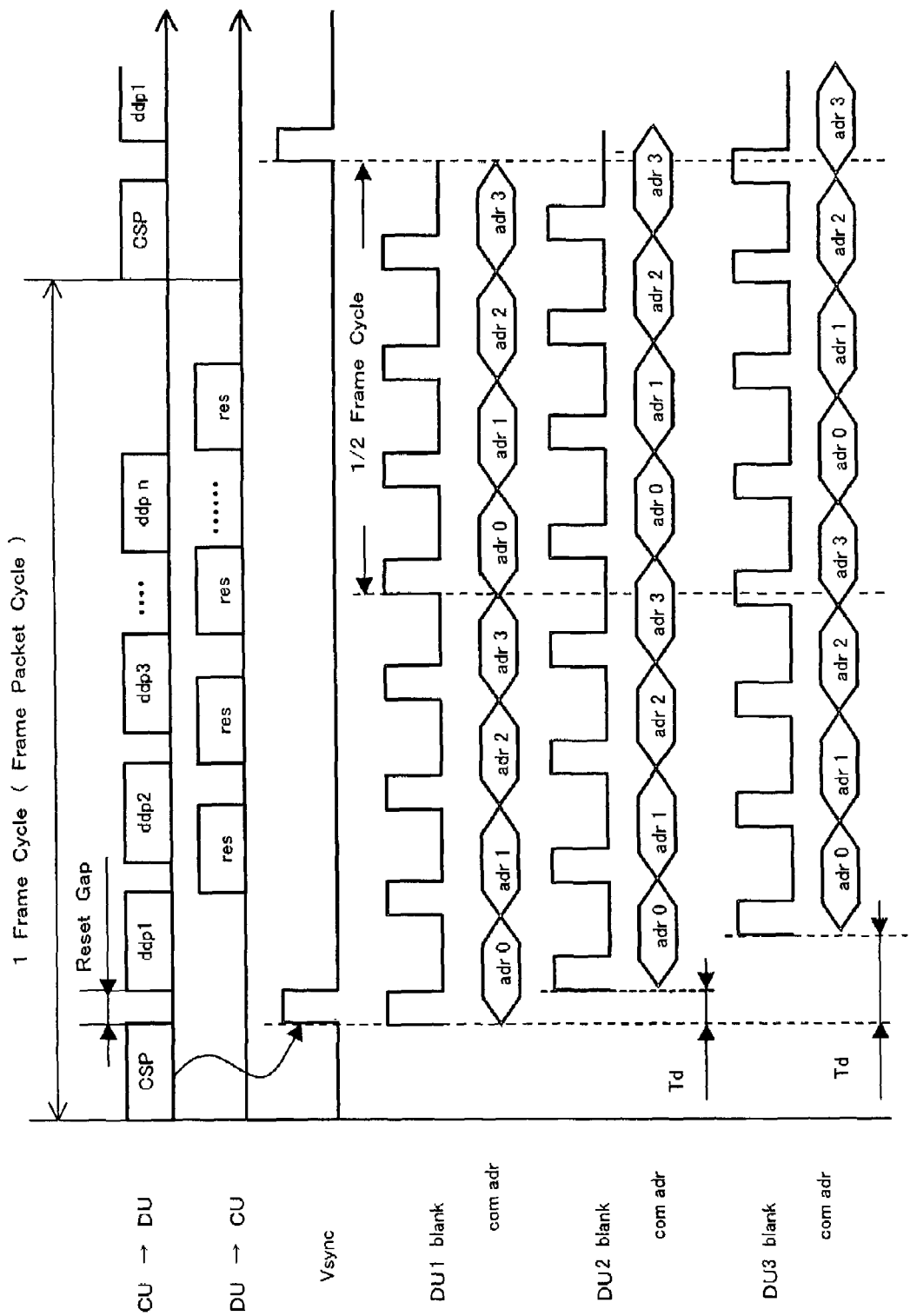
FIG. 16 is a timing chart showing image displaying control of an LED display unit communication system.
Figure 17:
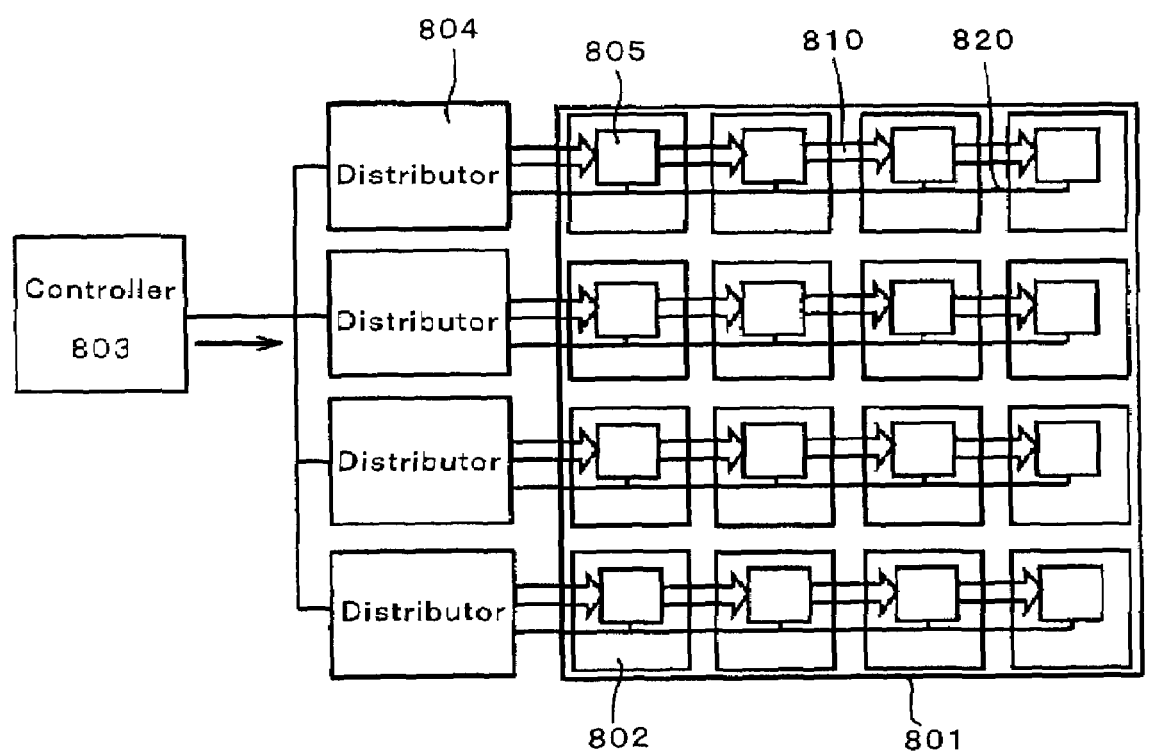
FIG. 17 is a schematic diagram of a related display unit communication system.

FIG. 16 shows an embodiment of communicating the display data in one frame in the display unit communication system according to the present invention.

The control unit 1 transfers the frame cycle start packet (csp) stating start of frame cycle as the command data to all of the display unit 3 corresponding to every Vsync stating to synchronizing signal of one frame, when image changes in video rate (for example 60 Hz). Then, the control unit 1 transfers the display data packets (ddp), which are the display data packets ddp1, ddp2, ddp3, . . . , ddpn one by after corresponding to the display units DU1, 2, 3, . . . , n constituting the display 10, as the command data in one frame cycle. Here, the identifying information corresponding to the connecting configuration of the terminal adaptors 2 and the display unit 3 is assigned to each of the display data packets ddp1, ddp2, ddp3, . . . , ddpn transferred from the control unit 1.

Each of the display units 3 receiving the frame cycle start packet (csp) performs frame synchronizing. At that time, each the display units 3 does not perform response process corresponding to the frame cycle start packet (csp), and does not transfer the response data (res). Next, each of the display units 3 performs receiving process, when the identifying information of the display data packet (dsp) received by the each of the display units 3 matches its own display unit ID (DUID). The display data packet received by the each of the display units 3 is stored into one of the two memories 331, 331 in the memory 33 alternatively, and controlled to display in next frame cycle.

FIG. 16 is an embodiment of timing chart showing displaying control of the display unit DU1–3. The display unit DU1 outputs frame-synchronizing signal Vsync, when receiving the frame cycle start packet (csp). Corresponding to the output of the frame-synchronizing signal Vsync, blank signal (blank) corresponding to display cycle of each line of the matrix display 30 is generated. Corresponding to the blank signal (blank), the common driver 340 and the line drivers 341 corresponding to each of the data controls the each of the LED to light, and displays image based on each of the data of the address com adr 0, 1, 2, 3 stored in the memory during last frame cycle. Here, this embodiment shows that each of pixels is driven corresponding to the each of line as ¼ duty, and in ½ frame cycle divided in one frame, same image is displayed twice in each of the ½ frame cycles as double-speed lighting control. The multi-speed lighting control can prevent flicker of displaying. Further, the line drivers 341 or drive line driving the LED can drive at random to prevent flicker of displaying.

Furthermore, lighting start timing of each of the display units 3, which is timing from output of the frame-synchronizing signal Vsync till generating timing of the blank signal (blank) in each of the display unit, can be shift with predetermined time Td as shown DU2, DU3 in FIG. 16. Accordingly, huge amount of the driving start current in start of lighting LED can be scattered to each of the LED driver. In addition, reset gap is inserted between the frame cycle start packet (csp) and the display data packet (ddp), and between each of the display data packets (ddp) to set time not to transfer in predetermined time, to synchronize each of communication packets in receiver side.

Further, in the embodiment, the display unit is shown as matrix display having a plurality of pixels disposed with LED as light emitting elements, the display unit can be constituted by one or more disposed pixel corresponding to light emitting elements. The light emitting elements can be liquid crystal, EL devices, PDP, bulbs such as in billboard or the like. Further more, the light emitting elements can be neon tube and so on, the display data can be employed as gradation of the lighting density.

As this invention may be embodied in several forms without departing from the spirit or essential characteristics thereof, the present embodiment is therefore illustrative and not restrictive, since the scope according to the present invention is defined by the appended claims rather than by the description preceding them, and all changes that fall within the metes and bounds of the claims, or the equivalence of such metes and bounds thereof are therefore intended to be embraced by the claims.

INDUSTRIAL APPLICABILITY

As described above, the invention can provide a lighting apparatus and a communication method therein, which can adjust to applications flexibly. For example, display units, which have different lighting gradation, pixel number, arrangement or the like, can be controlled in a common communication system and communication method. Further, the invention can provide a display unit, a communication circuit, and a terminal adaptor, which can be used in the lighting apparatus system and the communication method therein, which can adjust to applications flexibly.

The invention claimed is:

1. A lighting apparatus comprising:
   a plurality of display units;
   a control unit for providing display data in packet format to the display units; and
   at least one terminal adaptor assigned terminal adaptor ID and having a terminal adaptor side communication section connected with the control unit electrically via an upper communication line,
   the display units being assigned display unit ID, having a display unit side communication section, and driving at least one light emitting element based on the display data packets provided by the control unit, wherein the terminal adaptor communicates electrically with the display units via a lower communication line,
   wherein the display units are arranged in n rows, where n is an integer equal to two or more, and each of the communication sections of the display units in each row are connected to each other in series,
   wherein the communication section of the display unit at a downstream end position in the m-th row, as viewed from the control unit, is connected to the communication section of the display unit that is located in the (m+1)-th row and is positioned on the same side as the communication section of the display unit at the downstream position in the m-th row, where m is an integer and satisfies the relationship $1 \leq m \leq n-1$.

2. The lighting apparatus according to claim 1, wherein communication at the upper communication line employs higher speed communication than communication at the lower communication line.

3. A lighting apparatus comprising:
a plurality of display units;
a control unit for providing display data in packet format to the display units; and
a plurality of terminal adaptors assigned terminal adaptor ID and having a terminal adaptor side communication section connected with the control unit electrically via an upper communication line,
the display units being assigned display unit ID, having a display unit side communication section connected to at least one of the terminal adaptors via a lower communication line, and driving at least one light emitting element based on the display data packets provided by the control unit,
the terminal adaptors and/or the display units being arranged in n rows, wherein n is an integer that is equal to two or more, and each of the communication sections of the terminal adaptors and/or the display units in each of the rows are connected to each other in series,
wherein the communication section of the terminal adaptor and/or the display unit located in the m-th row at a downstream end position thereof, as viewed from the control unit, is connected to the communication section of the terminal adaptor and/or the display unit that is located in the (m+1)-th row and is positioned on the same side as the communication section of the terminal adaptor and/or display unit at the downstream position in the m-th row, where m is an integer and satisfies the relationship $1 \leq m \leq n-1$.

4. The lighting apparatus according to claim 3, wherein communication at the upper communication line employs higher speed communication than communication at the lower communication line.

* * * * *